United States Patent
Araki et al.

(10) Patent No.: US 6,172,157 B1
(45) Date of Patent: Jan. 9, 2001

(54) RUBBER COMPOSITIONS

(75) Inventors: Shunji Araki; Kazuhiro Yanagisawa, both of Kodaira (JP)

(73) Assignee: Bridgestone Corporation, Tokyo (JP)

( * ) Notice: Under 35 U.S.C. 154(b), the term of this patent shall be extended for 0 days.

(21) Appl. No.: 09/029,088

(22) PCT Filed: Jun. 26, 1997

(86) PCT No.: PCT/JP97/02223

§ 371 Date: Feb. 19, 1998

§ 102(e) Date: Feb. 19, 1998

(87) PCT Pub. No.: WO97/35918

PCT Pub. Date: Oct. 2, 1997

(30) Foreign Application Priority Data

| Jun. 26, 1996 | (JP) | 8-166448 |
| Jul. 25, 1996 | (JP) | 8-215040 |
| Jul. 25, 1996 | (JP) | 8-215041 |
| Jul. 25, 1996 | (JP) | 8-215042 |
| Jul. 25, 1996 | (JP) | 8-215043 |
| Aug. 21, 1996 | (JP) | 8-219557 |

(51) Int. Cl.$^7$ ............... C08J 5/10; C08K 3/36; C08L 83/00

(52) U.S. Cl. ............................. 524/506; 524/191

(58) Field of Search ................ 524/492–496, 524/191, 211–214, 230, 233, 506

(56) References Cited

U.S. PATENT DOCUMENTS

| 3,873,489 | * | 3/1975 | Thurn et al. ............... 260/33.6 AQ |
| 3,957,718 | * | 5/1976 | Pochert et al. ............. 260/38 |
| 5,026,762 | * | 6/1991 | Kida et al. ................. 524/495 |
| 5,198,171 | * | 3/1993 | Kasahara et al. ........... 264/211.23 |
| 5,719,207 | * | 2/1998 | Cohen et al. ............... 524/213 |

FOREIGN PATENT DOCUMENTS

| 2643919 | 4/1977 | (DE) . |
| 2933247A1 | 3/1980 | (DE) . |
| 0364428 | 4/1990 | (EP) . |
| 0366558 | 5/1990 | (EP) . |
| 0754571 | 1/1997 | (EP) . |
| 0761748A2 | 3/1997 | (EP) . |
| 0816424A1 | 1/1998 | (EP) . |
| 61-4742 | 1/1986 | (JP) . |
| 63-2886 | 1/1988 | (JP) . |
| 3-111438 | 5/1991 | (JP) . |
| 3-197536 | 8/1991 | (JP) . |
| 3-252431 | 11/1991 | (JP) . |
| 3-252433 | 11/1991 | (JP) . |
| 4-224840 | 8/1992 | (JP) . |
| 5-51484 | 3/1993 | (JP) . |
| 7-179666 | 9/1993 | (JP) . |
| 5-271477 | 10/1993 | (JP) . |
| 6-157825 | 6/1994 | (JP) . |
| 7-48476 | 2/1995 | (JP) . |
| 7-90122 | 4/1995 | (JP) . |
| 8-53002 | 2/1996 | (JP) . |
| 8-73657 | 3/1996 | (JP) . |

* cited by examiner

Primary Examiner—James J. Seidleck
Assistant Examiner—U. K. Rajguru
(74) Attorney, Agent, or Firm—Sughrue, Mion, Zinn, Macpeak & Seas, PLLC

(57) ABSTRACT

A rubber composition prepared by blending 15 to 85 parts by weight of silica per 100 parts by weight of a rubber component comprising natural rubber and/or diene base synthetic rubber and 1 to 15% by weight of a dispersion-improving agent based on the amount of the silica described above. Further, a rubber composition prepared by blending 20 to 60 parts by weight of silica and 30 to 80 parts by weight of carbon black having a cetyl trimethylammonium bromide-adsorbing amount (CTAB) of 120 $m^2/g$ or more and a dibutyl phthalate-absorbing amount (DBP) of 120 ml/100 g or more per 100 parts by weight of a rubber component comprising natural rubber and/or diene base synthetic rubber, and 3 to 15% by weight of a dispersion-improving agent based on the amount of the silica described above, wherein the total amount of silica and carbon black is 50 to 120 parts by weight. A specific nitrogen-containing carbonyl compound or silicone oil is used as a dispersion-improving agent.

35 Claims, No Drawings

RUBBER COMPOSITIONS

TECHNICAL FIELD

The present invention relates to a rubber composition blended with silica, more specifically to a rubber composition which is lowered in a Mooney viscosity and is improved in a low heat generating property and an abrasion resistance by improving the dispersibility of silica in rubber.

Further, the present invention relates to a rubber composition in which the dispersibility of silica is improved and efficient vulcanization is effectuated. Accordingly, the present invention relates to a rubber composition which improves a performance such as a braking property on a wet road (hereinafter called "wet performance"), a performance such as driving stability on a dry road (hereinafter called "dry performance") and an abrasion resistance for a tire in which the rubber composition described above is applied to a tread thereof.

BACKGROUND ART

Carbon black has so far been used as a reinforcing filler for rubber. This is because carbon black has a high reinforcing property and an excellent abrasion resistance as compared with those of other fillers. In recent years, under the circumstances of socially demanding for saving energy and natural resources, particularly in order to save a fuel consumption of automobiles, a reduction in heat generation of a rubber composition has come to be required at the same time.

In the case of intending a reduction in a heat generation of a rubber composition by virtue of carbon black, it is considered to fill a small amount of carbon black or to use carbon black having a large particle size. In either method, however, it is well known that a reduction in the heat generation has an antinomic relation with the reinforcing property and the abrasion resistance.

On the other hand, silica is known as a filler for reducing heat generation for a rubber composition, and there have so far been filed many patents such as Japanese Patent Application Laid-Open No. Hei 3-252431, Japanese Patent Application Laid-Open No. Hei 3-252433, Japanese Patent Application Laid-Open No. Hei 4-224840, Japanese Patent Application Laid-Open No. Hei 5-51484 and Japanese Patent Application Laid-Open No. Hei 5-271477.

Further, with respect to a tire tread, it is known that the wet skid characteristic is improved by blending a rubber composition for a tire tread with silica. On the other hand, however, the defect that the abrasion resistance is lowered is involved therein at the same time. Accordingly, a rubber composition blended with a vulcanization-controlling silane coupling agent is reported as a composition for solving the defect of reducing the abrasion resistance in a silica-blended tread (Japanese Patent Application Laid-Open No. Sho 61-4742).

Further, known are a rubber composition comprising a polymer blended with a specific amount of carbon black and a specific amount of silica and silane coupling agent (Japanese Patent Application Laid-Open No. Hei 5-271,i ) and a rubber composition for a tire tread improved in an abrasion resistance and a wet skid characteristic by virtue of specific silica and specific carbon black and devising a in kneading process, and a production process for said rubber composition (European Patent No. 501227). Further, known is a technique of blending a rubber composition for a tread comprising a specific polymer and specific carbon black with silica in order to improve the wet skid characteristic and the abrasion resistance, (Japanese Patent Application Laid-Open No. Hei 7-48476, Japanese Patent Application Laid-Open No. Hei 7-90122 and Japanese Patent Application Laid-Open No. Hei 8-73657).

However, silica tends to cause coagulation between the grains thereof by virtue of hydrogen bonds among silanol groups which are surface functional groups, and therefore the kneading time has to be extended in order to improve the dispersibility of silica in rubber. The insufficient dispersibility of silica in rubber brings about a problem that the rubber composition is increases its Mooney viscosity and is inferior in processability such as extrusion.

Further, there has been a problem that since the surface of silica grains is acidic, the grains adsorb a base material used as a vulcanization accelerator in vulcanizing the rubber composition and therefore the vulcanization is not sufficiently carried out, so that the elastic modulus is not enhanced.

Further, there is another problem that since the dynamic storage elastic modulus (E') is lowered in a silica-blended composition, the block rigidity of the tire tread is reduced to deteriorate the dry performance. A pneumatic tire in which a rubber composition obtained by blending a specific polymer and specific carbon black with silica is applied to a tread is reported as improving the wet performance, the abrasion resistance and the dry performance (Japanese Patent Application Laid-Open No. Hei 8-53002). In such case, however, the abrasion resistance has not necessarily been sufficiently improved since a material having a high glass transition temperature (Tg) is used as a rubber component.

Various silane coupling agents have been developed in order to solve these problems, but the dispersion of silica has not yet reached a sufficiently high level, and it has been particularly difficult to obtain the industrially good dispersion of silica.

Further, it is disclosed in Japanese Patent Publication No. Sho 63-2886 and Japanese Patent Application Laid-Open No. Hei 6-157825 to use hydrophobic precipitated silicic acid. However, there has been involved a drawback that since precipitated silicic acid subjected to complete hydrophobicity treatment is used, surface silanol groups which react with silane coupling agents disappear, and therefore rubber is not sufficiently reinforced.

On the other hand, it is disclosed in Japanese Patent Application Laid-Open No. Hei 3-197536 to try to improve the heat generating property by blending 100 parts by weight of at least one rubber selected from the group consisting of natural rubber and diene base synthetic rubber with 0.05 to 20 parts by weight of an alkylamine compound as well as 20 to 150 parts by weight of a reinforcing filler such as carbon black. However, it is neither disclosed nor suggested in the application described above that an improvement in the dispersibility of silica has been tried for a rubber composition blended with silica and that a heat generating property and an abrasion resistance have been improved in the rubber composition blended with silica.

Accordingly, an object of the present invention is to solve the above problems involved in conventional techniques and to provide a rubber composition in which the dispersibility of silica is improved and a Mooney viscosity is lowered and in which the low heat generating property and the abrasion resistance are improved.

Further, another object of the present invention is to provide a rubber composition which can improve the wet performance, the abrasion resistance and the dry performance of a tire with a good balance thereamong when applied to the tread of the tire.

DISCLOSURE OF THE INVENTION

The present inventors have done intensive researches on a silica-blended rubber composition in order to solve the problems described above and then have found that kneading a specific amount of a specific dispersion-improving agent into a prescribed amount of silica improves the dispersibility of silica in rubber to a large extent, lowers a Mooney viscosity of the rubber composition and provides the low heat generating property and the high abrasion resistance, and thus they have come to complete the present invention.

Further, the present inventors have done intensive researches on a silica-blended rubber composition in order to solve the problems described above and then have found that blending a prescribed amount of specific carbon black with a prescribed amount of silica and kneading a specific amount of a specific dispersion-improving agent into the blended silica improve the dispersibility of silica in rubber to a large extent, allow the efficient vulcanization to be carried out and provide a good wet performance, a good abrasion resistance and a good dry performance, and thus they have come to complete the present invention.

That is, according to one aspect of the present invention, there is provided a rubber composition prepared by blending 15 to 85 parts by weight of silica per 100 parts by weight of a rubber component comprising natural rubber and/or diene base synthetic rubber and 1 to 15% by weight of a dispersion-improving agent based on the amount of silica.

In the constitution described above, effective as the dispersion-improving agent described above is any one compound selected from nitrogen-containing carbonyl compounds represented by any of the following Formulas (I) to (III):

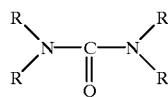

(I)

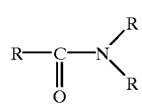

(II)

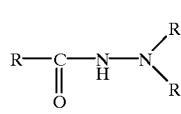

(III)

wherein R represents hydrogen, a linear or branched and saturated or unsaturated aliphatic hydrocarbon having 1 to 20 carbon atoms, an aromatic hydrocarbon or an alicyclic hydrocarbon and may be the same or different;

an amine-modified silicone oil represented by the following Formula (IV):

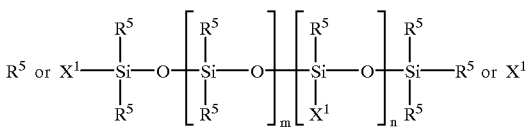

(IV)

wherein $R^5$ represents an alkyl group or a phenyl group; $1 \leq m+n \leq 200$ and $n/(m+n) \geq 0.15$; $X^1$ represents an amino group or an N-substituted amino group represented by $-R^1NR^2R^3$ or $-R^1NHR^4NR^2R^3$; $R^1$ and $R^4$ represent $-(CH_2)_n-$ (provided that n is 1, 2 or 3); $R^2$ and $R^3$ may be the same or different and represent a hydrogen atom, an alkyl group having 1 to 36 carbon atoms or a phenyl group; m and n represent the total number of the respective structural units and include a continuous one (block structure) and one disposed at random (random structure);

a fatty acid ester-modified silicone oil represented by the following Formula (V):

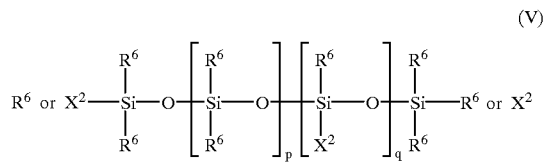

(V)

wherein $R^6$ represents an alkyl group or a phenyl group; $1 \leq p+q \leq 200$ and $q/(p+q) \geq 0.15$; $X^2$ represents a fatty acid ester group represented by $-OCOR^7$; $R^7$ represents an alkyl group or an alkenyl group each of which has 1 to 36 carbon atoms; p and q represent the total number of the respective structural units and include a continuous one (block structure) and one disposed at random (random structure);

an epoxy-modified silicone oil represented by the following Formula (VI):

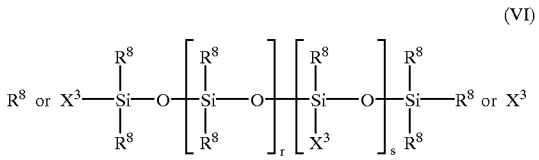

(VI)

wherein $R^8$ represents an alkyl group or a phenyl group; $1 \leq r+s \leq 200$ and $s/(r+s) \geq 0.15$; $X^3$ represents an epoxy-containing group represented by

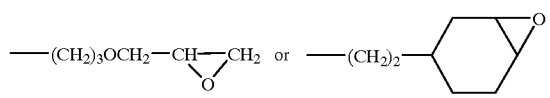

r and s represent the total number of the respective structural units and include a continuous one (block structure) and one disposed at random (random structure);

an alkoxy-modified silicone oil represented by the following Formula (VII):

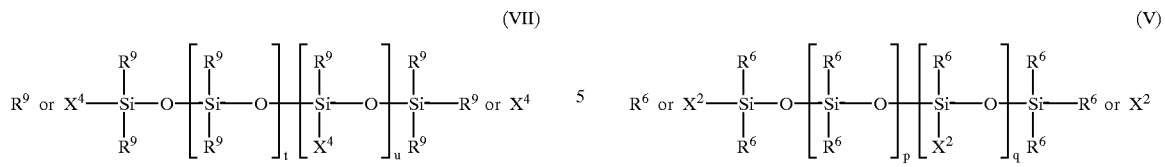

wherein $R^9$ represents an alkyl group or a phenyl group; $1 \leq t+u \leq 200$ and $u/(t+u) \geq 0.15$; $X^4$ represents an alkoxyl group; t and u represent the total number of the respective structural units and include a continuous one (block structure) and one disposed at random (random structure);

α,ω-dihydroxypolydimethylsiloxane represented by the following Formula (VIII):

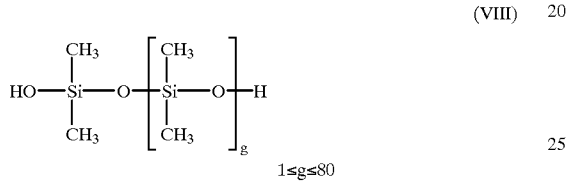

$1 \leq g \leq 80$

Further, according to another aspect of the present invention, there is provided a rubber composition prepared by blending 20 to 60 parts by weight of silica and 30 to 80 parts by weight of carbon black which has a cetyl trimethylammonium bromide-adsorbing amount (CTAB) of 120 m²/g or more and a dibutyl phthalate-absorbing amount (DBP) of 120 ml/100 g or more, per 100 parts by weight of a rubber component comprising natural rubber and/or diene base synthetic rubber, and 3 to 15% by weight of a dispersion-improving agent based on the amount of silica. The total amount of silica and carbon black is 50 to 120 parts by weight. In this case, effective as the dispersion-improving agent described above is any one compound selected from amine-modified silicone oils represented by the following Formula (IV):

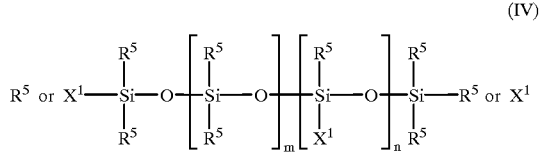

wherein $R^5$ represents an alkyl group or a phenyl group; $1 \leq m+n \leq 200$ and $n/(m+n) \geq 0.15$; $X^1$ represents an amino group or an N-substituted amino group represented by —$R^1NR^2R^3$ or —$R^1NHR^4NR^2R^3$; $R^1$ and $R^4$ represent —$(CH_2)_n$— (provided that n is 1, 2 or 3); $R^2$ and $R^3$ may be the same or different and represent a hydrogen atom, an alkyl group having 1 to 36 carbon atoms or a phenyl group; m and n represent the total number of the respective structural units and include a continuous one (block structure) and one disposed at random (random structure);

a fatty acid ester-modified silicone oil represented by the following Formula (V):

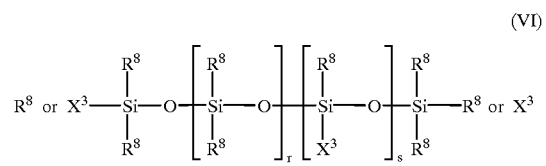

wherein $R^6$ represents an alkyl group or a phenyl group; $1 \leq p+q \leq 200$ and $q/(p+q) \geq 0.15$; $X^2$ represents a fatty acid ester group represented by —$OCOR^7$; $R^7$ represents an alkyl group or an alkenyl group each of which has 1 to 36 carbon atoms; p and q represent the total number of the respective structural units and include a continuous one (block structure) and one disposed at random (random structure);

an epoxy-modified silicone oil represented by the following Formula (VI):

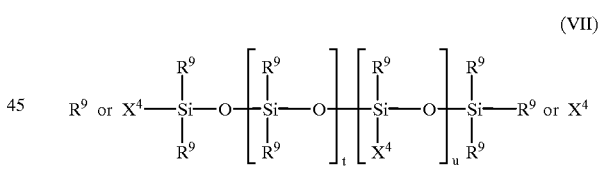

wherein $R^8$ represents an alkyl group or a phenyl group; $1 \leq r+s \leq 200$ and $s/(r+s) \geq 0.15$; $X^3$ represents an epoxy-containing group represented by

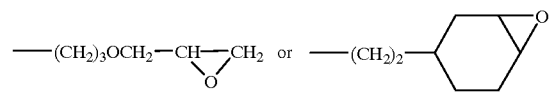

r and s represent the total number of the respective structural units and include a continuous one (block structure) and one disposed at random (random structure);

an alkoxy-modified silicone oil represented by the following Formula (VII):

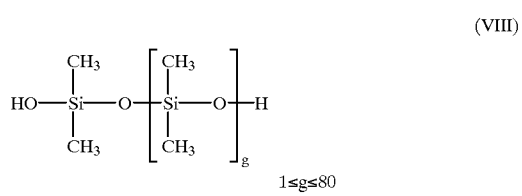

wherein $R^9$ represents an alkyl group or a phenyl group; $1 \leq t+u \leq 200$ and $u/(t+u) \geq 0.15$; $X^4$ represents an alkoxyl group; t and u represent the total number of the respective structural units and include a continuous one (block structure) and one disposed at random (random structure);

α,ω-dihydroxypolydimethylsiloxane represented by the following Formula (VIII):

(VIII)

HO—Si(CH₃)₂—O—[Si(CH₃)₂—O]g—H $1 \leq g \leq 80$ and a hydrogen silicone oil represented by the following Formula (IX):

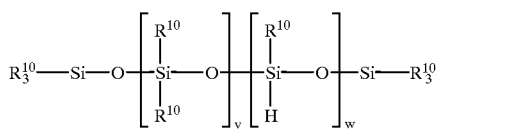

(IX)

wherein $R^{10}$ represents an alkyl group or a phenyl group; $1 \leq v+w \leq 200$ and $w/(v+w) \geq 0.15$; v and w represent the total number of the respective structural units and include a continuous one (block structure) and one disposed at random (random structure).

BEST MODE FOR CARRYING OUT THE INVENTION

The embodiment of the present invention shall be explained below in detail.

Natural rubber (NR) or synthetic rubber can be used alone or in a blend thereof for the rubber component in the present invention. The synthetic rubber includes, for example, synthetic polyisoprene rubber (IR), polybutadiene rubber (BR) and styrene-butadiene rubber (SBR).

Silica used in the present invention includes, for example, precipitated silica comprising synthetic hydrated silicic acid. In particular, precipitated silica having a nitrogen-adsorbing specific surface area of 120 to 300 $m^2/g$ is effective.

The dispersion-improving agent used in the present invention includes solid ones and liquid ones. When the dispersion-improving agent is liquid, an inorganic filler on which 30% by weight or more of the dispersion-improving agent described above is carried in advance is preferably used such that the proportion of the dispersion-improving agent described above is controlled to 3 to 15% by weight based on the amount of silica. The inorganic filler on which the dispersion-improving agent is carried includes calcium carbonate, zinc oxide, mica, silica and carbon black, and silica and carbon black having a high carrying capacity for the dispersion-improving agent are preferred.

The blending amount of the dispersion-improving agent described above is 1 to 15% by weight, preferably 3 to 15% by weight based on the amount of silica. In the case that the above blending amount of the dispersion-improving agent is less than 1% by weight, a reduction in the Mooney viscosity of the rubber component and an improvement in the low heat generating property and the abrasion resistance can not be expected. On the other hand, in the case that it exceeds 15% by weight, an action as a plasticizer is exerted to a large extent, and the abrasion resistance is reduced. Accordingly, neither case is preferred.

In the present invention, a silane coupling agent is preferably used in combination with the dispersion-improving agent. This is to allow the silanol groups present on the surface of silica to couple with the polymer to form a reinforcing phase.

Preferred as a silane coupling agent is a compound represented by the following Formula (X) or (XI):

$Y_3^1$—Si—$C_bH_{2b}S_aC_bH_{2b}$Si—$Y_3^1$ or $Y_3^1$—Si$C_bH_{2b}$—$X^5$ (X)

wherein $X^5$ represents a nitroso group, a mercapto group, a thiocyanate group, an amino group, an epoxy group, a vinyl group, a chlorine atom or an imide group; $Y^1$ represents an alkyl group having 1 to 4 carbon atoms, an alkoxyl group having 1 to 4 carbon atoms or a chlorine atom and may be the same or different; a represents an integer of 1 or more; and b represents an integer of 1 to 6:

$Y_3^2$—Si$C_bH_{2b}S_a$—$X^6$ (XI)

wherein $X^6$ is represented by any of the following formulas:

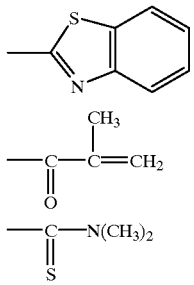

$Y^2$ represents an alkyl group having 1 to 4 carbon atoms, an alkoxyl group having 1 to 4 carbon atoms or a chlorine atom and may be the same or different; a represents an integer of 1 or more; and b represents an integer of 1 to 6

To be specific, the silane coupling agent represented by Formula (X) includes bis(3-triethoxysilylpropyl) polysulfide, γ-mercaptopropyltrimethoxysilane, γ-mercaptopropyltriethoxysilane and γ-thiocyanatepropyltriethoxysilane, and the silane coupling agent represented by Formula (XI) includes 3-trimethoxysilylpropyl-N,N-dimethylthiocarbamoyl tetrasulfide, trimethoxysilylpropylmercaptobenzothiazole tetrasulfide, triethoxysilylpropylmethacrylate monosulfide and dimethoxymethylsilylpropyl-N,N-dimethylthiocarbamoyl tetrasulfide.

The blending amount of the above silane coupling agent is 1 to 15% by weight, preferably 3 to 12% by weight based on the weight of silica. In the case that the blending amount of the silane coupling agent is less than 1% by weight, the coupling effect is small. On the other hand, in the case that it exceeds 15% by weight, the gelation of the polymer is caused. Accordingly, neither case is preferred.

Next, the first invention shall be explained.

The nitrogen-containing carbonyl compound used as one of the dispersion-improving agents in the present invention is at least one selected from the group consisting of the compounds represented by Formulas (I) to (III) described above, and they may be used alone or in combination of two or more kinds thereof.

The nitrogen-containing carbonyl compound used in the present invention has preferably a molecular weight of 250 or less. The specific examples thereof include urea, 1,1-dimethylurea, 1,3-dimethylurea, tetramethylurea, 1,3-diphenylurea and acetamide. When urea is used, the effect thereof is maximized, and therefore it is preferred.

The amine-modified silicone oil used as one of the dispersion-improving agents in the present invention is represented by Formula (IV) described above, wherein if the polymerization degree (m+n) of the siloxane bond is larger than 200, the effect of lowering the Mooney viscosity of the rubber composition is reduced, and the effect of improving the low heat generating property is reduced as well. Accordingly, the polymerization degree (m+n) of the siloxane bond is preferably 1 to 200, more preferably 1 to 100. If the content [n/(m+n)] of the amino group or the N-substituted amino group is smaller than 0.15, the aforementioned effects of the present invention can not be obtained sufficiently well, and therefore n/(m+n) is preferably 0.15 or more, more preferably 0.3 or more. Further, the bonding form of the amine may be any of a primary amine, a secondary amine and a tertiary amine. When carbon black is used, a secondary amine and a tertiary amine are preferred, and a tertiary amine is more preferred. When it is used in combination with carbon black, hydrogen bonded to the nitrogen atom accelerates vulcanization reaction. Therefore, the scorch time is shortened, which is not preferred in terms of processing. In the formula, $R^5$ is preferably an alkyl group having 1 to 3 carbon atoms.

The fatty acid ester-modified silicone oil used as one of the dispersion-improving agents in the present invention is represented by Formula (V) described above, wherein if the polymerization degree (p+q) of the siloxane bond is larger than 200, the effect of lowering the Mooney viscosity of the rubber composition is reduced, and the effect of improving the low heat generating property is reduced as well. Accordingly, the polymerization degree (p+q) of the siloxane bond is preferably 1 to 200, more preferably 1 to 100. If the content [q/(p+q)] of the fatty acid ester group is smaller than 0.15, the aforementioned effects of the present invention can not be obtained sufficiently well, and therefore q/(p+q) is preferably 0.15 or more, more preferably 0.3 or more. In the formula, $R^6$ is preferably an alkyl group having 1 to 3 carbon atoms.

The epoxy-modified silicone oil used as a dispersion-improving agent in the present invention is represented by Formula (VI) described above, wherein if the polymerization degree (r+s) of the siloxane bond is larger than 200, the effect of lowering the Mooney viscosity of the rubber composition is reduced, and the effect of improving the low heat generating property is reduced as well. Accordingly, the polymerization degree (r+s) of the siloxane bond is preferably 1 to 200, more preferably 1 to 100. If the content [s/(r+s)] of the epoxy-containing group is smaller than 0.15, the aforementioned effects of the present invention can not be obtained sufficiently well, and therefore s/(r+s) is preferably 0.15 or more, more preferably 0.3 or more. In the formula, $R^8$ is preferably an alkyl group having 1 to 3 carbon atoms.

The alkoxy-modified silicone oil used as one of the dispersion-improving agents in the present invention is represented by Formula (VII) described above, wherein if the polymerization degree (t+u) of the siloxane bond is larger than 200, the effect of lowering the Mooney viscosity of the rubber composition is reduced, and the effect of improving the low heat generating property is reduced as well. Accordingly, the polymerization degree (t+u) of the siloxane bond is preferably 1 to 200, more preferably 1 to 100. If the content [u/(t+u)] of the alkoxyl group is smaller than 0.15, the aforementioned effects of the present invention can not be obtained sufficiently well, and therefore u/(t+u) is preferably 0.15 or more, more preferably 0.3 or more. The preferred alkoxyl group is methoxyl, ethoxyl or propoxyl. In the formula, $R^9$ is preferably an alkyl group having 1 to 3 carbon atoms.

α,ω-Dihydroxypolydimethylsiloxane used as one of the dispersion-improving agents in the present invention is represented by Formula (VIII) described above, wherein if the polymerization degree g of the siloxane bond is larger than 80, the number per weight of the terminal silanol groups reacting with the silanol groups present on the surface of silica decreases, and the effects thereof can not be observed. Accordingly, the polymerization degree g of siloxane is preferably 1 to 80.

The blending amount of silica used in the present invention is 15 to 85 parts by weight, preferably 20 to 65 parts by weight per 100 parts by weight of the rubber component described above. In the case that the blending amount of silica is less than 15 parts by weight, the reinforcing property can not be obtained. On the other hand, in the case that it exceeds 85 parts by weight, the Mooney viscosity increases to deteriorate the workability such as warming extrusion. Accordingly, neither case is not preferred. The blending amount of silica is preferably 20 to 65 parts by weight in terms of the reinforcing property, the low heat generating property and the workability.

In the present invention, carbon black can further be used as a reinforcing filler. SAF, ISAF and HAF grades can preferably be used as carbon black used for the reinforcing filler in the present invention but carbon black shall not specifically be restricted to those carbon blacks mentioned above.

The blending amount of carbon black is preferably 20 to 80 parts by weight per 100 parts by weight of the rubber component described above. If the blending amount of carbon black exceeds 80 parts by weight, the high heat generating property is provided or the poor dispersion is caused to bring about a reduction in the processability in some case. On the other hand, if the blending amount is less than 20 parts by weight, the effect of blending carbon black is not observed so much. Accordingly, the blending amount is preferably 25 to 60 parts by weight in terms of the reinforcing property and the low heat generating property.

Next, the rubber composition according to another aspect of the present invention shall be explained in detail.

The amine-modified silicone oil used as one of the dispersion-improving agents in the present invention is represented by Formula (IV) described above, wherein if the polymerization degree (m+n) of the siloxane bond is larger than 200, the effect of lowering the Mooney viscosity of the rubber composition is reduced, and the effect of improving the low heat generating property is reduced as well. Accordingly, the polymerization degree (m+n) of the siloxane bond is preferably 1 to 200, more preferably 1 to 100. If the content [n/(m+n)] of the amino group or the N-substituted amino group is smaller than 0.15, the aforementioned effects of the present invention can not be obtained sufficiently well, and therefore n/(m+n) is preferably 0.15 or more, more preferably 0.3 or more. Further, the bonding form of the amine may be any of a primary amine, a secondary amine and a tertiary amine. When carbon black is used, a secondary amine and a tertiary amine are preferred, and a tertiary amine is more preferred. When it is used in combination with carbon black, hydrogen bonded to the nitrogen atom accelerates vulcanization reaction. Therefore, the scorch time is shortened, which is not preferred in terms of processing. In the formula, $R^5$ is preferably an alkyl group having 1 to 3 carbon atoms.

The fatty acid ester-modified silicone oil used as one of the dispersion-improving agents in the present invention is represented by Formula (V) described above, wherein if the polymerization degree (p+q) of the siloxane bond is larger than 200, the effect of lowering the Mooney viscosity of the rubber composition is reduced, and the effect of improving the heat generating property is reduced as well. Accordingly, the polymerization degree (p+q) of the siloxane bond is preferably 1 to 200, more preferably 1 to 100. If the content [q/(p+q)] of the fatty acid ester group is smaller than 0.15, the aforementioned effects of the present invention can not be obtained sufficiently well, and therefore q/(p+q) is preferably 0.15 or more, more preferably 0.3 or more. In the formula, $R^6$ is preferably an alkyl group having 1 to 3 carbon atoms.

The epoxy-modified silicone oil used as a dispersion-improving agent in the present invention is represented by Formula (VI) described above, wherein if the polymerization degree (r+s) of the siloxane bond is larger than 200, the effect of lowering the Mooney viscosity of the rubber composition is reduced, and the effect of improving the heat generating property is reduced as well. Accordingly, the polymerization degree (r+s) of the siloxane bond is preferably 1 to 200, more preferably 1 to 100. If the content [s/(r+s)] of the epoxy-containing group is smaller than 0.15, the aforementioned effects of the present invention can not be obtained sufficiently well, and therefore s/(r+s) is preferably 0.15 or more, more preferably 0.3 or more. In the formula, $R^8$ is preferably an alkyl group having 1 to 3 carbon atoms.

The alkoxy-modified silicone oil used as one of the dispersion-improving agents in the present invention is represented by Formula (VII) described above, wherein if the polymerization degree (t+u) of the siloxane bond is larger than 200, the effect of lowering the Mooney viscosity of the rubber composition is reduced, and the effect of improving the heat generating property is reduced as well. Accordingly, the polymerization degree (t+u) of the siloxane bond is preferably 1 to 200, more preferably 1 to 100. If the content [u/(t+u)] of the alkoxyl group is smaller than 0.15, the aforementioned effects of the present invention can not be obtained sufficiently well, and therefore u/(t+u) is preferably 0.15 or more, more preferably 0.3 or more. The preferred alkoxyl group is methoxyl, ethoxyl or propoxyl. In the formula, $R^9$ is preferably an alkyl group having 1 to 3 carbon atoms.

α,ω-Dihydroxypolydimethylsiloxane used as one of the dispersion-improving agents in the present invention is represented by Formula (VIII) described above, wherein if the polymerization degree g of the siloxane bond is larger than 80, the number per weight of the terminal silanol groups reacting with the silanol groups present on the surface of silica decreases, and the effects thereof can not be observed. Accordingly, the polymerization degree g of siloxane is preferably 1 to 80.

The hydrogen silicone oil used as a dispersion-improving agent in the present invention is represented by Formula (IX) described above, wherein if the polymerization degree (v+w) of the siloxane bond grows larger, the Mooney viscosity of the rubber composition is elevated, and the effect of improving the low heat generating property is reduced. Accordingly, the polymerization degree (v+w) of the siloxane bond is preferably 1 to 200, more preferably 1 to 100. If the content [w/(v+w)] of the hydrogen is smaller than 0.15, the dispersibility of silica in the rubber can not be improved sufficiently well, and the efficient vulcanization can not be carried out sufficiently well. Accordingly, w/(v+w) is preferably 0.15 or more, more preferably 0.3 or more.

The blending amount of silica used in the present invention 20 to 60 parts by weight, preferably 20 to 50 parts by weight per 100 parts by weight of the rubber component described above. In the case that the blend amount of silica is less than 20 parts by weight, the wet performance is inferior. On the other hand, in the case that it exceeds 60 parts by weight, the workability such as warming extrusion is deteriorated in some case. Accordingly, neither case is preferred.

Carbon black used as a reinforcing filler in the present invention preferably has a cetyl trimethylammonium bromide-adsorbing amount (CTAB) of 120 $m^2/g$ or more and a dibutyl phthalate-absorbing amount (DBP) of 120 ml/100 g or more. If CTAB is less than 120 $m^2/g$, the abrasion resistance tends to be reduced, and if DBP is less than 120 ml/100 g, the dry performance tends to be lowered. CTAB and DBP are values determined based on ASTM D3765-89 and JIS K6221, respectively.

The blending amount of carbon black is preferably 30 to 80 parts by weight, more preferably 30 to 60 parts by weight per 100 parts by weight of the rubber component described above. If this blending amount is less than 30 parts by weight, the dry performance tends to be lowered. On the other hand, if it exceeds 80 parts by weight, the Mooney viscosity of the rubber composition tends to be elevated, and the processability tends to be reduced.

Further, in the present invention, the total amount of silica and carbon black is preferably 50 to 120 parts by weight, more preferably 60 to 100 parts by weight per 100 parts by weight of the rubber component described above. If this total amount is less than 50 parts by weight, the wet performance, the dry performance and the abrasion resistance tend to be lowered. On the other hand, if it exceeds 120 parts by weight, the Mooney viscosity of the rubber composition tends to be elevated, and the processability tends to be reduced.

Presumed as follows is an action mechanism with respect to why the dispersibility of silica in the rubber is improved to a large extent and the heat generating property, the abrasion resistance and the dry performance are improved.

Usually, silica causes coagulation between silica grains by virtue of hydrogen bonds among silanol groups which are surface functional groups to bring about inferior dispersion in rubber. Further, there is a problem that since this silanol group is acidic, it has an action to adsorb a base material used as a vulcanization accelerator in vulcanizing the rubber composition and therefore the vulcanization would not be sufficiently carried out, so that the elastic modulus would not be increased.

Silane coupling agents usually used in the rubber industry reduce the amount of the silanol groups present on the surface of silica grains by dehydration condensation reaction of silanol groups on the surface of silica with silanol groups formed by the hydrolysis of alkoxyl groups to improve the dispersibility of silica in rubber. However, this reaction is difficult to take place at low a temperature and considered to go on at a temperature of 140° C. or higher. On the other hand, if the temperature is elevated to 170° C. or higher, a three dimensional cross-linking reaction of the rubber is brought about by a silane coupling agent, and the viscosity is drastically increased. Accordingly, the current situation is that the reaction time of silica with a silane coupling agent can not sufficiently be secured at an actual rubber-kneading step where the temperature of the kneaded rubber is rapidly elevated. However, the dispersion-improving agent used in the present invention does not cause the three dimensional cross-linking reaction of the rubber even at high temperatures, and therefore in order to prevent the three dimensional cross-linking reaction of the rubber, there can be used a method in which a kneading step is divided into multistage processing and in which temperature and time necessary for the reaction of silica with the active site of the dispersion-improving agent are sufficiently secured and then a silane coupling agent is added to be followed by kneading at a lower temperature.

As a result, in the rubber composition of the present invention, the dispersion of silica in the rubber is improved to a large extent and the Mooney viscosity of said rubber composition is reduced, and effective vulcanization is carried out. Accordingly, the heat generating property and the abrasion resistance are improved and further, the dry performance is improved as well since the dynamic storage elastic modulus goes up.

Here, the reaction of silica with the active site of the dispersion-improving agent means hydrogen-bonding between a nitrogen atom contained in the molecule and a silanol group present on the surface of silica in the case of the nitrogen-containing carbonyl compound and the amine-modified silicone oil, a dehydration condensation reaction of a silanol group formed by hydrolysis of the modified parts with a silanol group present on the surface of silica in the case of the fatty acid ester-modified silicone oil and the alkoxy-modified silicone oil, and a reaction of a silanol group present on the surface of silica with an epoxy group, a hydrogen atom directly bonded to a silicon atom in the main chain or a silanol group at the terminal in the cases of the epoxy-modified silicone oil, the hydrogen silicone oil or $\alpha,\omega$-dihydroxypolydimethylsiloxane, respectively. In particular, in the cases of the nitrogen-containing carbonyl compound and the amine-modified silicone oil, the hydrogen bond between the nitrogen atom contained in the molecule and the silanol group present on the surface of silica is not a primary bond but chemical adsorption, and therefore the effect of the dispersion improving agent is exhibited even in the range of room temperature. As a result, they have an effect of preventing silica grains from coagulating in the range of low temperatures at the beginning of kneading rubber.

EXAMPLES

The present invention shall specifically be explained below with reference to examples but the present invention shall not be restricted to the examples as long as the scope of the present invention is not exceeded.

Part and percentage shown in the examples are based on weight unless otherwise described.

Various measurements were carried out by the following methods.

1) Mooney viscosity

A Mooney viscosity ML 1+4 measured at 130° C. by a method according to JIS K6300 was used and shown by index in contrast with the control. The smaller the value of the index, the lower the Mooney viscosity and the better the processability.

2) Low heat generating property

An impact resilience modulus measured at a temperature of 25° C. according to JIS K6264-1993 was used and shown by index in contrast with the control. The smaller the value of the index, the higher the impact resilience modulus and the better the low heat generating property.

3) Abrasion resistance

An abrasion resistance index which shows an abrasion resistance was measured at a ground pressure of 0.5 Mpa and a slip rate of 40% by a method according to JIS K6255-1996 by means of a Lanbourn abrasion tester and calculated according to the following equation:

abrasion resistance index=(loss weight of control/loss weight of test piece)×100

It is shown that the larger this index is, the better the abrasion resistance is.

4) Dynamic storage elastic modulus (E')

Measured on the conditions of a tensile dynamic distortion of 1%, a frequency of 50 Hz and a temperature of 60° C. by means of a visco-elasticity spectrometer manufactured by Iwamoto Seisakusho Co., Ltd. A slab sheet having a thickness of about 2 mm and a width of 5 mm was used for the test piece, and set were a distance between the sample nippers to 2 cm and an initial load to 160 g. The value of E' was shown by an index, wherein the value of a control was set at 100. The larger the value is, the higher the E' is, and therefore the larger value is preferred.

5) Wet skid resistance

The wet skid resistance was obtained by measuring a slide resistance on a concrete road surface wetted with water at room temperature by means of a skid tester manufactured by Stanley London Co., Ltd., England. The evaluation thereof was shown by an index, wherein that of a control was set at 100. The larger the value is, the better the result is.

Rubber compositions for samples were prepared according to the recipe shown in Table 1. Shown respectively in the corresponding tables are the amounts of carbon black, silica and a silane coupling agent blended with the respective compositions, and the physical properties of the rubber compositions thus obtained.

TABLE 1

| Blend component | Weight parts |
|---|---|
| Rubber component | 100 |
| Silica | Variable |
| Carbon black | Variable |
| Aromatic oil | Variable |
| Stearic acid | 2 |
| Silane coupling agent | Variable |
| Dispersion-improving agent | Variable |
| Zinc oxide | 3 |
| Antioxidant[*1] | 1 |
| Vulcanization accelerator[*2] | 1.5 |
| Sulfur | 1.5 |

[*1]N-phenyl-N'-isopropyl-p-phenylenediamine
[*2]N-oxydiethylene-2-benzothiazole sulfenamide Comparative Examples 1 to 13 and Examples 1 to 18

A nitrogen-containing carbonyl compound represented by any of Formulas (I) to (III) described above was used as a dispersion-improving agent.

Aromatic oil is blended in an amount of 20 parts by weight per 100 parts by weight of the rubber component in all compositions.

Experiment 1

Comparative Examples 1 to 6 and Examples 1 to 10

The physical properties of the resulting rubber compositions are shown in Table 2 and Table 3.

TABLE 2

|  | Comparative Example 1 | Comparative Example 2 | Example 1 | Example 2 | Example 3 | Comparative Example 3 | Example 4 | Example 5 |
|---|---|---|---|---|---|---|---|---|
| Rubber component | | | | | | | | |
| NR | 30 | 30 | 30 | 30 | 30 | 30 | 30 | 30 |
| SBR1500*1 | 70 | 70 | 70 | 70 | 70 | 70 | 70 | 70 |
| BR01*2 | | | | | | | | |
| Silica*3 | 60 | 60 | 60 | 60 | 60 | 60 | 60 | 60 |
| Blend amount Nitrogen-containing compound blend amount | | | | | | | | |
| Urea | 0 | 0.5 | 1.0 | 3.0 | 8.0 | 10.0 | | |
| 1,1-dimethylurea | | | | | | | 3.0 | |
| 1,3-diphenylurea | | | | | | | | 3.0 |
| Acetamide | | | | | | | | |
| Propionamide | | | | | | | | |
| Coupling agent blend amount | | | | | | | | |
| Si69*4 | 6.0 | 6.0 | 6.0 | 6.0 | 6.0 | 6.0 | 6.0 | 6.0 |
| KBM803*5 | | | | | | | | |
| Mooney viscosity | 100 | 100 | 95 | 81 | 85 | 111 | 84 | 89 |
| Low heat generating property | 100 | 100 | 95 | 84 | 79 | 78 | 90 | 92 |
| Abrasion resistance | 100 | 100 | 104 | 121 | 124 | 120 | 109 | 109 |

*1Emulsion-polymerized SBR manufactured by Japan Synthetic Rubber Co., Ltd.
*2Polybutadiene manufactured by Japan Synthetic Rubber Co., Ltd.
*3Nipsil AQ manufactured by Nippon Silica Ind. Co., Ltd.
*4Bis(3-triethoxysilylpropyl)tetrasulfide manufactured by Degussa AG.
*5γ-Mercaptopropyltrimethoxysilane manufactured by Shin-etsu Chemical Ind. Co., Ltd.

TABLE 3

|  | Example 6 | Example 7 | Example 8 | Comparative Example 4 | Comparative Example 5 | Example 9 | Comparative Example 6 | Example 10 |
|---|---|---|---|---|---|---|---|---|
| Rubber component | | | | | | | | |
| NR | 30 | 30 | 30 | 30 | 30 | 30 | | |
| SBR1500*1 | 70 | 70 | 70 | 70 | 70 | 70 | 70 | 70 |
| BR01*2 | | | | | | | 30 | 30 |
| Silica*3 | 60 | 60 | 80 | 90 | 60 | 60 | 60 | 60 |
| Blend amount Nitrogen-containing compound blend amount | | | | | | | | |
| Urea | | | 4.5 | 4.5 | | 3.0 | | 3.0 |
| 1,1-dimethylurea | | | | | | | | |
| 1,3-diphenylurea | | | | | | | | |
| Acetamide | 3.0 | | | | | | | |
| Propionamide | | 3.0 | | | | | | |
| Coupling agent blend amount | | | | | | | | |
| Si69*4 | 6.0 | 6.0 | 8.0 | 9.0 | 1.2 | 1.2 | 6.0 | 6.0 |
| KBM803*5 | | | | | | | | |
| Mooney viscosity | 86 | 91 | 99 | 128 | 100 | 78 | 100 | 85 |
| Low heat generating property | 92 | 93 | 97 | 114 | 100 | 87 | 100 | 97 |
| Abrasion resistance | 107 | 108 | 131 | 133 | 100 | 111 | 100 | 110 |

*1Emulsion-polymerized SBR manufactured by Japan Synthetic Rubber Co., Ltd.
*2Polybutadiene manufactured by Japan Synthetic Rubber Co., Ltd.
*3Nipsil AQ manufactured by Nippon Silica Ind. Co., Ltd.
*4Bis(3-triethoxysilylpropyl)tetrasulfide manufactured by Degussa AG.
*5γ-Mercaptopropyltrimethoxysilane manufactured by Shin-etsu Chemical Ind. Co., Ltd.

The Mooney viscosities, the low heat generating properties and the abrasion resistances are shown by indices with Comparative Example 1 being set as a control in Comparative Examples 1 to 4 and Examples 1 to 8, with Comparative Example 5 being set as a control in Comparative Example 5 and Example 9 and with Comparative Example 6 being set as a control in Comparative Example 6 and Example 10.

Commercial silica, Nipsil AQ (nitrogen-adsorbing specific surface area: 195 $m^2$/g and oil absorbing amount: 190 ml/100 g) was used for silica in all examples and comparative examples.

In a system using bis(3-triethoxysilylpropyl) tetrasulfide (manufactured by Degussa AG.: hereinafter abbreviated as Si69) as a coupling agent, prepared in Comparative Example 1 was the rubber composition containing no nitrogen-containing carbonyl compound, and prepared in Comparative Examples 2 and 3 were the rubber compositions in which the amounts of the nitrogen-containing compound were deviated from the scope provided by the present invention.

Comparative Example 6 and Example 10 are examples in which the kind of the rubber was changed. It can be found that both the processability and the low heat generating property can be improved as well in these examples by blending the carbonyl compounds.

Experiment 2 (rubber compositions using carbon black in combination with silica)

Comparative Examples 7 to 10 and Examples 11 to 14

Rubber compositions for samples were prepared according to the recipe shown in Table 1. Shown in Table 4 are the amounts of carbon black, silica and the silane coupling agent blended with the respective compositions, and the physical properties of the rubber compositions thus obtained.

TABLE 4

|  | Comparative Example 7 | Example 11 | Example 12 | Comparative Example 8 | Example 9 | Example 13 | Comparative Example 10 | Example 14 |
|---|---|---|---|---|---|---|---|---|
| Rubber component | | | | | | | | |
| NR | 30 | 30 | 30 | 30 | 30 | 30 | 30 | 30 |
| SBR1500*[1] | 70 | 70 | 70 | 70 | 70 | 70 | 70 | 70 |
| BR01*[2] | | | | | | | | |
| Silica*[3] | 25 | 25 | 25 | 25 | 25 | 25 | 25 | 25 |
| Blend amount | | | | | | | | |
| Carbon black | | | | | | | | |
| HAF*[4] | 50 | 50 | 70 | 105 | | | 50 | 50 |
| SAF*[5] | | | | | 50 | 50 | | |
| Nitrogen-containing Compound blend amount Urea | 0 | 2.5 | 2.5 | 2.5 | 0 | 2.5 | 0 | 2.5 |
| Coupling agent Blend amount | | | | | | | | |
| Si69*[6] | 2.5 | 2.5 | 2.5 | 2.5 | 2.5 | 2.5 | | |
| KBM803*[7] | | | | | | | 0.5 | 0.5 |
| Mooney viscosity | 100 | 87 | 94 | 137 | 100 | 93 | 100 | 94 |
| Low heat generating property | 100 | 88 | 94 | 152 | 100 | 95 | 100 | 95 |
| Abrasion resistance | 100 | 118 | 127 | 94 | 100 | 110 | 100 | 109 |

*[1]Emulsion-polymerized SBR manufactured by Japan Synthetic Rubber Co., Ltd.
*[2]Polybutadiene manufactured by Japan Synthetic Rubber Co., Ltd.
*[3]Nipsil AQ manufactured by Nippon Silica Ind. Co., Ltd.
*[4]Seast 3H manufactured by Tokai Carbon Co., Ltd.
*[5]Seast 9 manufactured by Tokai Carbon Co., Ltd.
*[6]Bis(3-triethoxysilylpropyl)tetrasulfide manufactured by Degussa AG.
*[7]γ-Mercaptopropyltrimethoxysilane manufactured by Shin-etsu Chemical Ind. Co., Ltd.

It can be found that the processability and the low heat generating property can be improved at the same time by blending a specific amount of the carbonyl compound. Too much carbonyl compound causes scorch and therefore makes the processability inferior (Comparative Example 3).

Further, it can be found from Examples 4, 5, 6 and 7 that the effects remain unchanged even if the kind of the carbonyl compound is changed.

Comparative Example 4 and Example 8 are examples in which the amount of silica was changed. It can be found that too much amount of silica makes the low heat generating property inferior.

Comparative Example 5 and Example 9 are examples in which the kind of the coupling agent was changed, and The Mooney viscosities, the low heat generating property and the abrasion resistances are shown by indices with Comparative Example 7 being set as a control in Comparative Examples 7 and 8 and Examples 11 and 12, with Comparative Example 9 being set as a control in Comparative Example 9 and Example 13 and with Comparative Example 10 being set as a control in Comparative Example 10 and Example 14.

It can be found from Examples 11 and 12 and Comparative Example 8 that the effects remain unchanged even if the amount of carbon black is changed but too much amount thereof is not so good, and it can be found from Comparative Example 9 and Example 13 that the effects remain unchanged even if the kind of the carbon black is changed.

Further, it can be found from Comparative Example 10 and Example 14 that the effects remain unchanged even if the kind of the silane coupling agent is changed.

Experiment 3 (rubber compositions having a small blending amount of silica)

Comparative Examples 11 to 13 and Examples 15 to 18

Rubber compositions for samples were prepared according to the recipe shown in Table 1. Shown in Table 5 are the amounts of carbon black, silica and the silane coupling agent blended with the respective compositions, and the physical properties of the rubber compositions thus obtained.

TABLE 5

|  | Comparative Example 11 | Example 15 | Example 16 | Comparative Example 12 | Example 17 | Comparative Example 13 | Example 18 |
|---|---|---|---|---|---|---|---|
| Rubber component |  |  |  |  |  |  |  |
| NR | 30 | 30 |  | 30 | 30 | 30 | 30 |
| SBR1500*[1] | 70 | 70 | 70 | 70 | 70 | 70 | 70 |
| BR01*[2] |  |  | 30 |  |  |  |  |
| Silica*[3] | 5.0 | 15 | 15 | 15 | 15 | 15 | 15 |
| Blend amount |  |  |  |  |  |  |  |
| Nitrogen-containing | 0 | 1.5 | 1.5 | 0 | 1.5 | 0 | 1.5 |
| Compound blend amount |  |  |  |  |  |  |  |
| Urea |  |  |  |  |  |  |  |
| Carbon black |  |  |  |  |  | 45 | 45 |
| HAF*[4] |  |  |  |  |  |  |  |
| Coupling agent blend amount |  |  |  |  |  |  |  |
| Si69*[5] | 0.5 | 1.5 | 1.5 |  |  | 1.5 | 1.5 |
| KBM803*[6] |  |  |  | 0.3 | 0.3 |  |  |
| Mooney viscosity | 100 | 100 | 83 | 105 | 97 | 100 | 94 |
| Low heat generating property | 100 | 101 | 92 | 108 | 99 | 100 | 93 |
| Abrasion resistance | 100 | 151 | 211 | 147 | 160 | 100 | 107 |

*[1]Emulsion-polymerized SBR manufactured by Japan Synthetic Rubber Co., Ltd.
*[2]Polybutadiene manufactured by Japan Synthetic Rubber Co., Ltd.
*[3]Nipsil AQ manufactured by Nippon Silica Ind. Co., Ltd.
*[4]Seast 3H manufactured by Tokai Carbon Co., Ltd.
*[5]Bis(3-triethoxysilylpropyl)tetrasulfide manufactured by Degussa AG.
*[6]γ-Mercaptopropyltrimethoxysilane manufactured by Shin-etsu Chemical Ind. Co., Ltd.

The Mooney viscosities, the low heat generating properties and the abrasion resistances are shown by indices with Comparative Example 11 being set as a control in Comparative Examples 11 and 12 and Examples 15 to 17 and with Comparative Example 13 being set as a control in Comparative Example 13 and Example 18.

It can be found from Comparative Examples 11 and 12 and Examples 15 to 17 that the low heat generating property can be improved by blending a specific amount of the carbonyl compound according to the present invention. Further, it can be found from Comparative Example 13 and Example 18 that the same effects can be obtained as well in a system using silica in combination with carbon black.

Comparative Examples 14 to 24 and Examples 19 to 32

Rubber compositions were prepared in the recipes shown in the following Tables 7 and 8 according to the basic recipe shown in Table 1 described previously. Various amine-modified silicon oils used for the above compositions are shown in the following Table 6.

TABLE 6

$$Me_3Si-O-\left(\begin{array}{c}Me\\|\\Si-O\\|\\Me\end{array}\right)_m\left(\begin{array}{c}Me\\|\\Si-O\\|\\X^1\end{array}\right)_n-SiMe_3$$

|  | m | n | m + n | n/(m + n) | Amino group |
|---|---|---|---|---|---|
| Sample A | 13 | 13 | 26 | 0.50 | —$(CH_2)_3NH_2$ |
| Sample B | 59 | 33 | 92 | 0.36 | —$(CH_2)_3NH_2$ |
| Sample C | 139 | 193 | 232 | 0.40 | —$(CH_2)_3NH_2$ |
| Sample D | 43 | 6 | 49 | 0.12 | —$(CH_2)_3NH_2$ |

TABLE 6-continued $$Me_3Si-O-\left(\begin{array}{c}Me\\|\\Si-O\\|\\Me\end{array}\right)_m\left(\begin{array}{c}Me\\|\\Si-O\\|\\X^1\end{array}\right)_n-SiMe_3$$

|  | m | n | m + n | n/(m + n) | Amino group |
|---|---|---|---|---|---|
| Sample E | 27 | 6 | 33 | 0.18 | —$(CH_2)_3NH_2$ |
| Sample F | 14 | 12 | 26 | 0.46 | —$(CH_2)_3NH(CH_2)_2NH_2$ |
| Sample G | 12 | 14 | 26 | 0.54 | —$(CH_2)_3N(CH_3)_2$ |
| Sample H | 10 | 12 | 22 | 0.55 | —$(CH_2)_3N(CH_3)(C_{18}H_{37})$ |

The rubber compositions obtained in the examples and the comparative examples were evaluated for a low heat generating property, an abrasion resistance and a Mooney viscosity.

In the evaluation, the rubber composition obtained in Comparative Example 14 was used as a control in Table 7.

Further, used as controls respectively in Table 8 were the rubber composition obtained in Comparative Example 20 in a non-carbon-black-blended system and the rubber composition obtained in Comparative Example 23 in a carbon black-blended system.

TABLE 7

| | Comparative Example | | Example | | | | Comparative Example | Example | Comparative Example | | Example | | | | | Comparative Example | Example |
|---|---|---|---|---|---|---|---|---|---|---|---|---|---|---|---|---|---|
| | 14 | 15 | 19 | 20 | 21 | 22 | 16 | 23 | 17 | 18 | 24 | 25 | 26 | 27 | 28 | 19 | 29 |
| Component (parts by weight) | | | | | | | | | | | | | | | | | |
| BR01*[1] | — | — | — | — | — | — | — | — | — | — | — | — | — | — | — | — | 20 |
| SBR1500*[1] | 65 | 65 | 65 | 65 | 65 | 65 | 65 | 65 | 65 | 65 | 65 | 65 | 65 | 65 | 65 | 65 | 45 |
| NR | 35 | 35 | 35 | 35 | 35 | 35 | 35 | 35 | 35 | 35 | 35 | 35 | 35 | 35 | 35 | 35 | 35 |
| Silica (Nipsil AQ)*[2] | 60 | 60 | 60 | 60 | 54 | 60 | 60 | 60 | 60 | 60 | 60 | 60 | 60 | 60 | 80 | 90 | 60 |
| Carbon black (Seast 3H)*[3] | — | — | — | — | — | — | — | — | — | — | — | — | — | — | — | — | — |
| Aromatic oil | 20 | 19.5 | 18 | 14 | 14 | 11 | 8 | 14 | 14 | 14 | 14 | 14 | 14 | 14 | 8 | 6.5 | 14 |
| Silane coupling agent Si69*[4] | 6 | 6 | 6 | 6 | 6 | 6 | 6 | 6 | 6 | 6 | 6 | 6 | 6 | 6 | 8 | 9 | 6 |
| Amine-modified silicone oil (sample type) | — | 0.5 (A) | 2 (A) | 6 (A) | 6 (A)*[5] | 9 (A) | 12 (A) | 6 (B) | 6 (C) | 6 (D) | 6 (E) | 6 (F) | 6 (G) | 6 (H) | 12 (A) | 13.5 (A) | 6 (A) |
| Evaluation | | | | | | | | | | | | | | | | | |
| Low heat generating property (index) | 100 | 100 | 97 | 93 | 92 | 91 | 89 | 96 | 101 | 98 | 9 | 93 | 92 | 91 | 97 | 102 | 88 |
| Abrasion resistance (index) | 100 | 98 | 102 | 104 | 103 | 101 | 98 | 106 | 100 | 97 | 102 | 103 | 104 | 103 | 121 | 126 | 113 |
| Mooney viscosity (index) | 100 | 99 | 95 | 90 | 91 | 84 | 80 | 93 | 97 | 98 | 94 | 92 | 89 | 88 | 94 | 102 | 92 |

*[1]manufactured by Japan Synthetic Rubber Co., Ltd.
*[2]manufactured by Nippon Silica Ind. Co., Ltd.
*[3]manufactured by Tokai Carbon Co., Ltd.
*[4]Bis(3-triethoxysilylpropyl)tetrasulfide manufactured by Degussa AG.
*[5]Silica obtained by carrying Sample A on Nipsil AQ in a ratio 1:1 was used in an amount of 12 parts by weight. To be specific, 100 g of Nipsil AQ was put in a Henschel mixer, and 100 g of an amine-modified silicone oil was added thereto. The mixture was stirred at room temperature for 10 minutes to obtain a silica sample carrying the amine-modified silicone oil.

TABLE 8

| | Comparative Example | | | Example | Comparative Example | Example | | Comparative Example |
|---|---|---|---|---|---|---|---|---|
| | 20 | 21 | 22 | 30 | 23 | 31 | 32 | 24 |
| Composition (parts by weight) | | | | | | | | |
| NR | 100 | 100 | 100 | 100 | 100 | 100 | 100 | 100 |
| Silica (Nipsil AQ)*[2] | 10 | 10 | 20 | 20 | 30 | 30 | 20 | 20 |
| Carbon black (Seast 3H)*[3] | — | — | — | — | 55 | 55 | 70 | 90 |
| Aromatic oil | 20 | 19 | 20 | 18 | 20 | 17 | 18 | 18 |
| Silane coupling agent Si69*[4] | 1 | 1 | 2 | 2 | 3 | 3 | 2 | 2 |
| Amine-modified silicone oil (sample type) | — | 1(A) | — | 2(A) | — | 3(A) | 2(A) | 2(A) |

TABLE 8-continued

|  | Comparative Example | | | Example | Comparative Example | Example | | Comparative Example |
|---|---|---|---|---|---|---|---|---|
|  | 20 | 21 | 22 | 30 | 23 | 31 | 32 | 24 |
| Evaluation | | | | | | | | |
| Low heat generating property (index) | 100 | 100 | 103 | 96 | 100 | 95 | 98 | 105 |
| Abrasion resistance (index) | 100 | 99 | 106 | 102 | 100 | 102 | 122 | 133 |
| Mooney viscosity (index) | 100 | 99 | 105 | 98 | 100 | 94 | 98 | 108 |

As apparent from the results shown in Table 7 and Table 8, the rubber compositions of the present invention blended with the amine-modified silicone oil are reduced in a Mooney viscosity and improved in a heat generating property and an abrasion resistance.

Comparative Examples 25 to 35 and Examples 33 to 45

Rubber compositions were prepared in the recipes shown in the following Tables 10 and 11 according to the basic recipe shown in Table 1 described previously. Various fatty acid ester-modified silicone oils used for the above compositions are shown in the following Table 9.

TABLE 9

$$Me_3Si-O-\left(\begin{array}{c}Me\\|\\Si-O\\|\\Me\end{array}\right)_p\left(\begin{array}{c}Me\\|\\Si-O\\|\\X^2\end{array}\right)_q-SiMe_3$$

|  | p | q | p + q | q/(p + q) | Fatty acid ester group |
|---|---|---|---|---|---|
| Sample A | 17 | 21 | 38 | 0.55 | —OCCH$_3$<br>‖<br>O |
| Sample B | 67 | 30 | 97 | 0.31 | —OCCH$_3$<br>‖<br>O |
| Sample C | 150 | 72 | 222 | 0.32 | —OCCH$_3$<br>‖<br>O |

TABLE 9-continued $$Me_3Si-O-\left(\begin{array}{c}Me\\|\\Si-O\\|\\Me\end{array}\right)_p\left(\begin{array}{c}Me\\|\\Si-O\\|\\X^2\end{array}\right)_q-SiMe_3$$

|  | p | q | p + q | q/(p + q) | Fatty acid ester group |
|---|---|---|---|---|---|
| Sample D | 38 | 5 | 43 | 0.12 | —OCCH$_3$<br>‖<br>O |
| Sample E | 32 | 7 | 39 | 0.18 | —OCCH$_3$<br>‖<br>O |
| Sample F | 15 | 25 | 37 | 0.68 | —OC(CH$_2$)$_{16}$CH$_3$<br>‖<br>O |
| Sample G | 14 | 25 | 39 | 0.64 | —OC(CH$_2$)$_7$CH=CH(CH$_2$)$_7$CH$_3$<br>‖<br>O |

The rubber compositions obtained in the examples and the comparative examples were evaluated for a low heat generating property, an abrasion resistance and a Mooney viscosity.

In the evaluation, the rubber composition obtained in Comparative Example 25 was used as a control in Table 10. Further, used as controls respectively in Table 11 were the rubber composition obtained in Comparative Example 31 in a non-carbon-black-blended system and the rubber composition obtained in Comparative Example 34 in a carbon black-blended system.

TABLE 10

|  | Comparative Example | | Example | | | | Comparative Example | Example | Comparative Example | | Example | | | | Comparative Example | Example |
|---|---|---|---|---|---|---|---|---|---|---|---|---|---|---|---|---|
|  | 25 | 26 | 33 | 34 | 35 | 36 | 27 | 37 | 28 | 29 | 38 | 39 | 40 | 41 | 30 | 42 |
| Composition (parts by weight) | | | | | | | | | | | | | | | | |
| BR01*[1] | — | — | — | — | — | — | — | — | — | — | — | — | — | — | — | 20 |
| SBR1500*[1] | 65 | 65 | 65 | 65 | 65 | 65 | 65 | 65 | 65 | 65 | 65 | 65 | 65 | 65 | 65 | 45 |
| NR | 35 | 35 | 35 | 35 | 35 | 35 | 35 | 35 | 35 | 35 | 35 | 35 | 35 | 35 | 35 | 35 |
| Silica | 60 | 60 | 60 | 60 | 54 | 60 | 60 | 60 | 60 | 60 | 60 | 60 | 60 | 80 | 90 | 60 |

TABLE 10-continued

|  | Comparative Example | | Example | | | | Comparative Example | Example | Comparative Example | | Example | | | | Comparative Example | Example |
| --- | --- | --- | --- | --- | --- | --- | --- | --- | --- | --- | --- | --- | --- | --- | --- | --- |
|  | 25 | 26 | 33 | 34 | 35 | 36 | 27 | 37 | 28 | 29 | 38 | 39 | 40 | 41 | 30 | 42 |
| (Nipsil AQ)*² |  |  |  |  |  |  |  |  |  |  |  |  |  |  |  |  |
| Carbon black (Seast 3H)*³ | — | — | — | — | — | — | — | — | — | — | — | — | — | — | — | — |
| Aromatic oil | 20 | 19.5 | 18 | 14 | 14 | 11 | 8 | 14 | 14 | 14 | 14 | 14 | 14 | 8 | 6.5 | 14 |
| Silane coupling agent Si69*⁴ | 6 | 6 | 6 | 6 | 6 | 6 | 6 | 6 | 6 | 6 | 6 | 6 | 6 | 8 | 9 | 6 |
| Fatty acid ester-modified silicone oil (sample type) | — | 0.5 (A) | 2 (A) | 6 (A) | 6 (A)*⁵ | 9 (A) | 12 (A) | 6 (B) | 6 (C) | 6 (D) | 6 (E) | 6 (F) | 6 (G) | 12 (A) | 13.5 (A) | 6 (A) |
| Evaluation |  |  |  |  |  |  |  |  |  |  |  |  |  |  |  |  |
| Low heat generating property (index) | 100 | 100 | 94 | 92 | 92 | 89 | 87 | 96 | 100 | 103 | 96 | 90 | 94 | 96 | 107 | 86 |
| Abrasion resistance (index) | 100 | 102 | 104 | 105 | 104 | 104 | 98 | 107 | 101 | 98 | 102 | 106 | 102 | 124 | 131 | 118 |
| Mooney viscosity (index) | 100 | 98 | 94 | 93 | 91 | 88 | 86 | 94 | 102 | 98 | 96 | 92 | 95 | 95 | 112 | 96 |

*¹manufactured by Japan Synthetic Rubber Co., Ltd.
*²manufactured by Nippon Silica Ind. Co., Ltd.
*³manufactured by Tokai Carbon Co., Ltd.
*⁴Bis(3-triethoxysilylpropyl)tetrasulfide manufactured by Degussa AG.
*⁵Silica obtained by carrying Sample A on Nipsil AQ in a ratio 1:1 was used in an amount of 12 parts by weight. To be specific, 100 g of Nipsil AQ was put in a Henschel mixer, and 100 g of an fatty acid ester-modified silicone oil was added thereto. The mixture was stirred at room temperature for 10 minutes to obtain a silica sample carrying the fatty acid ester-modified silicone oil.

TABLE 11

|  | Comparative Example | | Example | Comparative Example | Example | | Comparative Example |
| --- | --- | --- | --- | --- | --- | --- | --- |
|  | 31 | 32 | 33 | 43 | 34 | 44 | 45 | 35 |
| Composition (parts by weight) |  |  |  |  |  |  |  |  |
| NR | 100 | 100 | 100 | 100 | 100 | 100 | 100 | 100 |
| Silica (Nipsil AQ)*² | 10 | 10 | 20 | 20 | 30 | 30 | 20 | 20 |
| Carbon black (Seast 3H)*³ | — | — | — | — | 55 | 55 | 70 | 90 |
| Aromatic oil | 20 | 19 | 20 | 18 | 20 | 17 | 18 | 18 |
| Silane coupling agent Si69*⁴ | 1 | 1 | 2 | 2 | 3 | 3 | 2 | 2 |
| Fatty acid ester-modified silicone oil (sample type) | — | 1(A) | — | 2(A) | — | 3(A) | 2(A) | 2(A) |
| Evaluation |  |  |  |  |  |  |  |  |
| Low heat generating property (index) | 100 | 98 | 106 | 99 | 100 | 93 | 98 | 108 |
| Abrasion resistance (index) | 100 | 99 | 112 | 114 | 100 | 104 | 125 | 134 |
| Mooney viscosity (index) | 100 | 100 | 104 | 98 | 100 | 94 | 99 | 109 |

As apparent from the results shown in Table 10 and Table 11, the rubber compositions of the present invention blended with the fatty acid ester-modified silicone oil are reduced in a Mooney viscosity and improved in a heat generating property and an abrasion resistance.

Comparative Examples 36 to 46 and Examples 46 to 56

Rubber compositions were prepared in the recipes shown in the following Tables 13 and 14 according to the basic recipe shown in Table 1 described previously. Various epoxy-modified silicone oils used for the above compositions are shown in the following Table 12.

TABLE 12

$$Me_3Si-O \left( \begin{array}{c} Me \\ | \\ Si-O \\ | \\ Me \end{array} \right)_r \left( \begin{array}{c} Me \\ | \\ Si-O \\ | \\ X^3 \end{array} \right)_s SiMe_3$$

| | r | s | r + s | s/(r + s) | Epoxy group |
|---|---|---|---|---|---|
| Sample A | 21 | 14 | 35 | 0.40 | —(CH$_2$)$_3$OCH$_2$-CH—CH$_2$ \ O / |
| Sample B | 46 | 52 | 98 | 0.53 | —(CH$_2$)$_3$OCH$_2$-CH—CH$_2$ \ O / |
| Sample C | 116 | 107 | 213 | 0.50 | —(CH$_2$)$_3$OCH$_2$-CH—CH$_2$ \ O / |
| Sample D | 24 | 4 | 28 | 0.14 | —(CH$_2$)$_3$OCH$_2$-CH—CH$_2$ \ O / |

TABLE 12-continued $$Me_3Si-O \left( \begin{array}{c} Me \\ | \\ Si-O \\ | \\ Me \end{array} \right)_r \left( \begin{array}{c} Me \\ | \\ Si-O \\ | \\ X^3 \end{array} \right)_s SiMe_3$$

| | r | s | r + s | s/(r + s) | Epoxy group |
|---|---|---|---|---|---|
| Sample E | 13 | 17 | 30 | 0.57 | —(CH$_2$)$_2$-⟨cyclohexene oxide⟩ |

The rubber compositions obtained in the examples and the comparative examples were evaluated for a low heat generating property, an abrasion resistance and a Mooney viscosity.

In the evaluation, the rubber composition obtained in Comparative Example 36 was used as a control in Table 13. Further, used as controls respectively in Table 14 were the rubber composition obtained in Comparative Example 42 in a non-carbon-black-blended system and the rubber composition obtained in Comparative Example 45 in a carbon-black-blended system.

TABLE 13

| | Comparative Example | | Example | | | | Comparative Example | Example | Comparative Example | | Example | | Comparative Example | Example |
|---|---|---|---|---|---|---|---|---|---|---|---|---|---|---|
| | 36 | 37 | 46 | 47 | 48 | 49 | 38 | 50 | 39 | 40 | 51 | 52 | 41 | 53 |
| Component (parts by weight) | | | | | | | | | | | | | | |
| BR01*[1] | — | — | — | — | — | — | — | — | — | — | — | — | — | 20 |
| SBR1500*[1] | 65 | 65 | 65 | 65 | 65 | 65 | 65 | 65 | 65 | 65 | 65 | 65 | 65 | 45 |
| NR | 35 | 35 | 35 | 35 | 35 | 35 | 35 | 35 | 35 | 35 | 35 | 35 | 35 | 35 |
| Silica (Nipsil AQ)*[2] | 60 | 60 | 60 | 60 | 54 | 60 | 60 | 60 | 60 | 60 | 60 | 80 | 90 | 60 |
| Carbon black (Seast 3H)*[3] | — | — | — | — | — | — | — | — | — | — | — | — | — | — |
| Aromatic oil | 20 | 19.5 | 18 | 14 | 14 | 11 | 8 | 14 | 14 | 14 | 14 | 8 | 6.5 | 14 |
| Silane coupling agent Si69*[4] | 6 | 6 | 6 | 6 | 6 | 6 | 6 | 6 | 6 | 6 | 6 | 8 | 9 | 6 |
| Epoxy-modified silicone oil (sample type) | — | 0.5 (A) | 2 (A) | 6 (A) | 6 (A)*[5] | 9 (A) | 12 (A) | 6 (B) | 6 (C) | 6 (D) | 6 (E) | 12 (A) | 13.5 (A) | 6 (A) |
| Evaluation | | | | | | | | | | | | | | |
| Low heat generating property (index) | 100 | 99 | 96 | 91 | 90 | 87 | 85 | 94 | 102 | 100 | 93 | 96 | 104 | 86 |
| Abrasion resistance (index) | 100 | 98 | 101 | 105 | 104 | 103 | 100 | 106 | 101 | 99 | 104 | 118 | 125 | 116 |
| Mooney viscosity (index) | 100 | 100 | 94 | 89 | 90 | 85 | 78 | 94 | 95 | 92 | 92 | 98 | 104 | 94 |

*1: manufactured by Japan Synthetic Rubber Co., Ltd.
*2: manufactured by Nippon Silica Ind. Co., Ltd.
*3: manufactured by Tokai Carbon Co., Ltd.
*4: Bis(3-triethoxysilylpropyl)tetrasulfide manufactured by Degussa AG.
*5: Silica obtained by carrying Sample A on Nipsil AQ in a ratio 1:1 was used in an amount of 12 parts by weight. To be specific, 100 g of Nipsil AQ was put in a Henschel mixer, and 100 g of an epoxy-modified silicone oil was added thereto. The mixture was stirred at room temperature for 10 minutes to obtain a silica sample carrying the epoxy-modified silicone oil.

TABLE 14

|  | Comparative Example | | | Example | Comparative Example | Example | | Comparative Example |
|---|---|---|---|---|---|---|---|---|
|  | 42 | 43 | 44 | 54 | 45 | 55 | 56 | 46 |
| Composition (parts by weight) | | | | | | | | |
| NR | 100 | 100 | 100 | 100 | 100 | 100 | 100 | 100 |
| Silica (Nipsil AQ)*2 | 10 | 10 | 20 | 20 | 30 | 30 | 20 | 20 |
| Carbon black (Seast 3H)*3 | — | — | — | — | 55 | 55 | 70 | 90 |
| Aromatic oil | 20 | 19 | 20 | 18 | 20 | 17 | 18 | 18 |
| Silane coupling agent Si69*4 | 1 | 1 | 2 | 2 | 3 | 3 | 2 | 2 |
| Fatty ester-modified silicone oil (sample type) | — | 1(A) | — | 2(A) | — | 3(A) | 2(A) | 2(A) |
| Evaluation | | | | | | | | |
| Low heat generating property (index) | 100 | 100 | 102 | 97 | 100 | 92 | 98 | 108 |
| Abrasion resistance (index) | 100 | 98 | 109 | 112 | 100 | 104 | 129 | 138 |
| Mooney viscosity (index) | 100 | 98 | 104 | 96 | 100 | 91 | 97 | 112 |

As apparent from the results shown in Table 13 and Table 14, the rubber compositions of the present invention blended with the epoxy-modified silicone oil are reduced in a Mooney viscosity and improved in a heat generating property and an abrasion resistance.

Comparative Examples 47 to 57 and Examples 57 to 69

Rubber compositions were prepared in the recipes shown in the following Tables 16 and 17 according to the basic recipe shown in Table 1 described previously. Various alkoxyl-modified silicone oils used for the above compositions are shown in the following Table 15.

TABLE 15

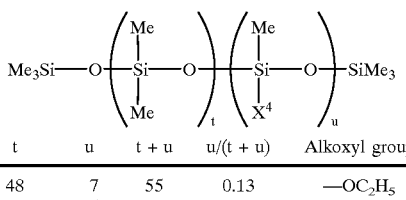

|  | t | u | t + u | u/(t + u) | Alkoxyl group |
|---|---|---|---|---|---|
| Sample A | 12 | 14 | 26 | 0.54 | —OC$_2$H$_5$ |
| Sample B | 58 | 35 | 93 | 0.38 | —OC$_2$H$_5$ |
| Sample C | 152 | 53 | 205 | 0.26 | —OC$_2$H$_5$ |

TABLE 15-continued $$Me_3Si-O\left(\begin{array}{c}Me\\|\\Si-O\\|\\Me\end{array}\right)_t\left(\begin{array}{c}Me\\|\\Si-O\\|\\X^4\end{array}\right)_u SiMe_3$$

|  | t | u | t + u | u/(t + u) | Alkoxyl group |
|---|---|---|---|---|---|
| Sample D | 48 | 7 | 55 | 0.13 | —OC$_2$H$_5$ |
| Sample E | 24 | 5 | 29 | 0.17 | —OC$_2$H$_5$ |
| Sample F | 15 | 15 | 30 | 0.50 | —OCH$_3$ |
| Sample G | 12 | 18 | 30 | 0.60 | —OC$_3$H$_7$ |

The rubber compositions obtained in the examples and the comparative examples were evaluated for a low heat generating property, an abrasion resistance and a Mooney viscosity.

In the evaluation, the rubber composition obtained in Comparative Example 47 was used as a control in Table 16. Further, used as controls respectively in Table 17 were the rubber composition obtained in Comparative Example 53 in a non-carbon-black-blended system and the rubber composition obtained in Comparative Example 56 in a carbon-black-blended system.

TABLE 16

|  | Comparative Example | | Example | | | | Comparative Example | Example | Comparative Example | | Example | | | | Comparative Example | Example |
|---|---|---|---|---|---|---|---|---|---|---|---|---|---|---|---|---|
|  | 47 | 48 | 57 | 58 | 59 | 60 | 49 | 61 | 50 | 51 | 62 | 63 | 64 | 65 | 52 | 66 |
| Composition (parts by weight) | | | | | | | | | | | | | | | | |
| BR01*1 | — | — | — | — | — | — | — | — | — | — | — | — | — | — | — | 20 |
| SBR1500*1 | 65 | 65 | 65 | 65 | 65 | 65 | 65 | 65 | 65 | 65 | 65 | 65 | 65 | 65 | 65 | 45 |
| NR | 35 | 35 | 35 | 35 | 35 | 35 | 35 | 35 | 35 | 35 | 35 | 35 | 35 | 35 | 35 | 35 |

TABLE 16-continued

| | Comparative Example | | Example | | | | Comparative Example | Example | Comparative Example | | Example | | | | Comparative Example | Example |
|---|---|---|---|---|---|---|---|---|---|---|---|---|---|---|---|---|
| | 47 | 48 | 57 | 58 | 59 | 60 | 49 | 61 | 50 | 51 | 62 | 63 | 64 | 65 | 52 | 66 |
| Silica (Nipsil AQ)*2 | 60 | 60 | 60 | 60 | 54 | 60 | 60 | 60 | 60 | 60 | 60 | 60 | 60 | 80 | 90 | 60 |
| Carbon black (Seast 3H)*3 | — | — | — | — | — | — | — | — | — | — | — | — | — | — | — | — |
| Aromatic oil | 20 | 19.5 | 18 | 14 | 14 | 11 | 8 | 14 | 14 | 14 | 14 | 14 | 14 | 8 | 6.5 | 14 |
| Silane coupling agent Si69*4 | 6 | 6 | 6 | 6 | 6 | 6 | 6 | 6 | 6 | 6 | 6 | 6 | 6 | 8 | 9 | 6 |
| Alkoxyl-modified silicone oil (sample type) | — | 0.5 (A) | 2 (A) | 6 (A) | 6 (A)*5 | 9 (A) | 12 (A) | 6 (B) | 6 (C) | 6 (D) | 6 (E) | 6 (F) | 6 (G) | 12 (A) | 13.5 (A) | 6 (A) |
| Evaluation | | | | | | | | | | | | | | | | |
| Low heat generating property (index) | 100 | 100 | 96 | 90 | 91 | 88 | 86 | 94 | 101 | 102 | 97 | 88 | 94 | 97 | 104 | 88 |
| Abrasion resistance (index) | 100 | 99 | 102 | 104 | 104 | 102 | 98 | 107 | 98 | 94 | 102 | 102 | 103 | 114 | 122 | 115 |
| Mooney viscosity (index) | 100 | 96 | 95 | 92 | 91 | 87 | 84 | 96 | 98 | 94 | 98 | 86 | 95 | 96 | 105 | 90 |

*1 manufactured by Japan Synthetic Rubber Co., Ltd.
*2 manufactured by Nippon Silica Ind. Co., Ltd.
*3 manufactured by Tokai Carbon Co., Ltd.
*4 Bis(3-triethoxysilylpropyl)tetrasulfide manufactured by Degussa AG.
*5 Silica obtained by carrying Sample A on Nipsil AQ in a ratio 1:1 was used in an amount of 12 parts by weight. To be specific, 100 g of Nipsil AQ was put in a Henschel mixer, and 100 g of an alkoxyl-modified silicone oil was added thereto. The mixture was stirred at room temperature for 10 minutes to obtain a silica sample carrying the alkoxyl-modified silicone oil.

TABLE 17

| | Comparative Example | | | Example | Comparative Example | Example | | Comparative Example |
|---|---|---|---|---|---|---|---|---|
| | 53 | 54 | 55 | 67 | 56 | 68 | 69 | 57 |
| Composition (parts by weight) | | | | | | | | |
| NR | 100 | 100 | 100 | 100 | 100 | 100 | 100 | 100 |
| Silica (Nipsil AQ)*2 | 10 | 10 | 20 | 20 | 30 | 30 | 20 | 20 |
| Carbon black (Seast 3H)*3 | — | — | — | — | 55 | 55 | 70 | 90 |
| Aromatic oil | 20 | 19 | 20 | 18 | 20 | 17 | 18 | 18 |
| Silane coupling agent Si69*4 | 1 | 1 | 2 | 2 | 3 | 3 | 2 | 2 |
| Alkoxyl-modified silicone oil (sample type) | — | 1(A) | — | 2(A) | — | 3(A) | 2(A) | 2(A) |
| Evaluation | | | | | | | | |
| Low heat generating property (index) | 100 | 100 | 105 | 98 | 100 | 92 | 99 | 107 |
| Abrasion resistance (index) | 100 | 98 | 115 | 116 | 100 | 102 | 128 | 136 |
| Mooney viscosity (index) | 100 | 96 | 104 | 97 | 100 | 91 | 96 | 112 |

As apparent from the results shown in Table 16 and Table 17, the rubber compositions of the present invention blended with the alkoxyl-modified silicone oil are reduced in a Mooney viscosity and improved in a heat generating property and an abrasion resistance according to the present invention as has so far been explained above.

Comparative Examples 58 to 67 and Examples 70 to 80

Rubber compositions were prepared in the recipes shown in the following Tables 19 and 20 according to the basic recipe shown in Table 1 described previously. Various α,ω-dihydroxypolydimethylsiloxanes used for the above compositions are shown in the following Table 18.

TABLE 18

$$HO-\underset{\underset{CH_3}{|}}{\overset{\overset{CH_3}{|}}{Si}}-O\left(\underset{\underset{CH_3}{|}}{\overset{\overset{CH_3}{|}}{Si}}-O\right)_g H$$

|  | g |
|---|---|
| Sample A | 10 |
| Sample B | 40 |
| Sample C | 70 |
| Sample D | 120 |

The rubber compositions obtained in the examples and the comparative examples were evaluated for a low heat generating property, an abrasion resistance and a Mooney viscosity.

In the evaluation, the rubber composition obtained in Comparative Example 58 was used as a control in Table 19. Further, used as controls respectively in Table 20 were the rubber composition obtained in Comparative Example 63 in a non-carbon-black-blended system and the rubber composition obtained in Comparative Example 66 in a carbon-black-blended system.

TABLE 19

|  | Comparative Example | | Example | | | | Comparative Example |
|---|---|---|---|---|---|---|---|
|  | 58 | 59 | 70 | 71 | 72 | 73 | 60 |
| Composition (parts by weight) | | | | | | | |
| BR01*¹ | — | — | — | — | — | — | — |
| SBR1500*¹ | 65 | 65 | 65 | 65 | 65 | 65 | 65 |
| NR | 35 | 35 | 35 | 35 | 35 | 35 | 35 |
| Silica (Nipsil AQ)*² | 60 | 60 | 60 | 60 | 54 | 60 | 60 |
| Carbon black (Seast 3H)*³ | — | — | — | — | — | — | — |
| Aromatic oil | 20 | 19.5 | 18 | 14 | 14 | 11 | 8 |
| Silane coupling agent Si69*⁴ | 6 | 6 | 6 | 6 | 6 | 6 | 6 |
| α,ω-dihydroxy-polydimethyl-siloxane (sample type) | — | 0.5 (A) | 2 (A) | 6 (A) | 6 (A)*⁵ | 9 (A) | 12 (A) |
| Evaluation | | | | | | | |
| Low heat generating property (index) | 100 | 100 | 94 | 88 | 86 | 84 | 84 |
| Abrasion resistance (index) | 100 | 100 | 104 | 106 | 107 | 103 | 98 |
| Mooney viscosity (index) | 100 | 98 | 94 | 90 | 88 | 85 | 82 |

TABLE 19-continued

|  | Example | | Comparative Example | Example | Comparative Example | Example |
|---|---|---|---|---|---|---|
|  | 74 | 75 | 61 | 76 | 62 | 77 |
| Composition (parts by weight) | | | | | | |
| BR01*¹ | — | — | — | — | — | 20 |
| SBR1500*¹ | 65 | 65 | 65 | 65 | 65 | 45 |
| NR | 35 | 35 | 35 | 35 | 35 | 35 |
| Silica (Nipsil AQ)*² | 60 | 60 | 60 | 80 | 90 | 60 |
| Carbon black (Seast 3H)*³ | — | — | — | — | — | — |
| Aromatic oil | 14 | 14 | 14 | 8 | 6.5 | 14 |
| Silane coupling agent Si69*⁴ | 6 | 6 | 6 | 8 | 9 | 6 |
| α,ω-dihydroxypoly-dimethylsiloxane (sample type) | 6 (B) | 6 (C) | 6 (D) | 12 (A) | 13.5 (A) | 6 (A) |
| Evaluation | | | | | | |
| Low heat generating property (index) | 94 | 96 | 102 | 96 | 105 | 85 |
| Abrasion resistance (index) | 104 | 102 | 98 | 116 | 118 | 112 |
| Mooney viscosity (index) | 93 | 95 | 98 | 95 | 107 | 92 |

*¹manufactured by Japan Synthetic Rubber Co., Ltd.
*²manufactured by Nippon Silica Ind. Co., Ltd.
*³manufactured by Tokai Carbon Co., Ltd.
*⁴Bis(3-triethoxysilylpropyl)tetrasulfide manufactured by Degussa AG.
*⁵Silica obtained by carrying Sample A on Nipsil AQ in a ratio 1:1 was used in an amount of 12 parts by weight. To be specific, 100 g of Nipsil AQ was put in a Henschel mixer, and 100 g of α,ω-dihydroxypolydimethylsiloxane was added thereto. The mixture was stirred at room temperature for 10 minutes to obtain a silica sample carrying α,ω-dihydroxypolydimethylsiloxane.

TABLE 20

|  | Comparative Example | | | Example | Comparative Example | Example | | Comparative Example |
|---|---|---|---|---|---|---|---|---|
|  | 63 | 64 | 65 | 78 | 66 | 79 | 80 | 67 |
| Composition (parts by weight) | | | | | | | | |
| NR | 100 | 100 | 100 | 100 | 100 | 100 | 100 | 100 |
| Silica | 10 | 10 | 20 | 20 | 30 | 30 | 20 | 20 |

TABLE 20-continued

|  | Comparative Example | | | Example | Comparative Example | Example | | Comparative Example |
|---|---|---|---|---|---|---|---|---|
|  | 63 | 64 | 65 | 78 | 66 | 79 | 80 | 67 |
| (Nipsil AQ)*² | | | | | | | | |
| Carbon black (Seast 3H)*³ | — | — | — | — | 55 | 55 | 70 | 90 |
| Aromatic oil | 20 | 19 | 20 | 18 | 20 | 17 | 18 | 18 |
| Silane coupling agent Si69*⁴ | 1 | 1 | 2 | 2 | 3 | 3 | 2 | 2 |
| α,ω-dihydroxy-polydimethyl-siloxane (sample type) | — | 1(A) | — | 2(A) | — | 3(A) | 2(A) | 2(A) |
| Evaluation | | | | | | | | |
| Low heat generating property (index) | 100 | 99 | 104 | 97 | 100 | 94 | 98 | 106 |
| Abrasion resistance (index) | 100 | 98 | 116 | 118 | 100 | 102 | 124 | 130 |
| Mooney viscosity (index) | 100 | 96 | 103 | 96 | 100 | 92 | 98 | 111 |

As apparent from the results shown in Table 19 and Table 20, the rubber compositions of the present invention blended with α,ω-dihydroxypolydimethylsiloxane are reduced in a Mooney viscosity and improved in a heat generating property and an abrasion resistance according to the present invention as has so far been explained above.

Comparative Examples 68 to 77 and Examples 81 to 93

Rubber compositions were prepared in the recipes shown in the following Tables 23 and 24 according to the basic recipe shown in Table 1 described previously. Shown respectively are various carbon blacks in Table 21 and various alkoxyl-modified silicone oils in the following Table 22 each of which is used for the above compositions.

TABLE 21

|  | Type of carbon black* | | | |
|---|---|---|---|---|
|  | N134 | N234 | N220 | N125 |
| CTAB (m²/g) | 134 | 120 | 110 | 126 |
| DBP (ml/100 g) | 127 | 125 | 114 | 104 |

*manufactured by Asahi Carbon Co., Ltd.

TABLE 22

$(CH_3)_3Si-O-\left(\begin{array}{c}CH_3\\|\\Si-O\\|\\CH_3\end{array}\right)_t \left(\begin{array}{c}CH_3\\|\\Si-O\\|\\OC_2H_5\end{array}\right)_u Si-(CH_3)_3$

|  | t | u | t + u | u/(t + u) |
|---|---|---|---|---|
| Sample A | 24 | 5 | 29 | 0.17 |
| Sample B | 15 | 15 | 30 | 0.50 |
| Sample C | 58 | 35 | 93 | 0.38 |
| Sample D | 152 | 53 | 205 | 0.26 |
| Sample E | 48 | 7 | 55 | 0.13 |

The rubber compositions obtained in the examples and the comparative examples were evaluated for a dynamic storage elastic modulus (E'), an abrasion resistance and a wet skid resistance by the evaluation methods described previously.

TABLE 23

|  | Comparative Example | | Example | | Comparative Example | | Example |
|---|---|---|---|---|---|---|---|
|  | 68 | 69 | 81 | 82 | 70 | 71 | 83 |
| Composition (parts by weight) | | | | | | | |
| NR 0120*¹ | 94.5 | 94.5 | 94.5 | 94.5 | 94.5 | 94.5 | 94.5 |
| BR01*¹ | 30 | 30 | 30 | 30 | 30 | 30 | 30 |
| Aromatic oil | 5.5 | 5.5 | 5.5 | 5.5 | 5.5 | 5.5 | 5.5 |
| Silica (Nipsil AQ)*² | 30 | 60 | 30 | 30 | 30 | 30 | 25 |
| Carbon black*³ | | | | | | | |
| Blend amount | 30 | — | 30 | 30 | 30 | 30 | 30 |
| Type | N134 | — | N134 | N134 | N134 | N134 | N134 |
| Silane coupling agent Si69*⁴ | 1.5 | 3 | 1.5 | 1.5 | 1.5 | 1.5 | 1.25 |
| Alkoxyl-modified silicone oil | | | | | | | |
| A | — | — | 1.5 | 1.5 | 1.5 | 1.5 | 2.5 |
| B | — | — | — | — | — | — | — |
| C | — | — | — | — | — | — | — |
| D | — | — | — | — | — | — | — |
| E | — | — | — | — | — | — | — |
| Evaluation | | | | | | | |
| E' (index) | 100 | 87 | 112 | 106 | 95 | 98 | 108 |
| Abrasion resistance (index) | 100 | 84 | 109 | 105 | 96 | 104 | 106 |
| Wet skid resistance (index) | 100 | 118 | 104 | 102 | 96 | 97 | 102 |

|  | Comparative Example | Example | Comparative Example | Example | Comparative Example |
|---|---|---|---|---|---|
|  | 72 | 84 | 85 | 73 | 86 | 74 |
| Composition (parts by weight) | | | | | | |
| NR 0120*¹ | — | — | — | — | — | — |
| BR01*¹ | 94.5 | 94.5 | 94.5 | 94.5 | 94.5 | 94.5 |
| Aromatic oil | 30 | 30 | 30 | 30 | 30 | 30 |
| Silica | 5.5 | 5.5 | 5.5 | 5.5 | 5.5 | 5.5 |
|  | 15 | 20 | 20 | 30 | 60 | 70 |

TABLE 23-continued

| (Nipsil AQ)*2 Carbon black*3 | | | | | | |
|---|---|---|---|---|---|---|
| Blend amount | 30 | 80 | 80 | 100 | 20 | 10 |
| Type | N134 | N134 | N134 | N134 | N134 | N134 |
| Silane coupling agent Si69*4 | 0.75 | 1.0 | 1.0 | 1.5 | 3.0 | 3.5 |
| Alkoxyl-modified silicone oil | | | | | | |
| A | 1.5 | 2.0 | 2.0 | 3.0 | 6.0 | 8.0 |
| B | — | — | — | — | — | — |
| C | — | — | — | — | — | — |
| D | — | — | — | — | — | — |
| E | — | — | — | — | — | — |
| Evaluation | | | | | | |
| E' (index) | 104 | 120 | 114 | 137 | 100 | 101 |
| Abrasion resistance (index) | 99 | 124 | 118 | 91 | 104 | 94 |
| Wet skid resistance (index) | 95 | 105 | 102 | 106 | 120 | 126 |

*1 manufactured by Japan Synthetic Rubber Co., Ltd.
*2 manufactured by Nippon Silica Ind. Co., Ltd.
*3 manufactured by Tokai Carbon Co., Ltd.
*4 Bis(3-triethoxysilylpropyl)tetrasulfide manufactured by Degussa AG.

In the comparative examples, the Mooney viscosities are high, and therefore the kneaded rubbers have very bad surfaces. Further, they are inferior in the dispersibility of carbon black and therefore reduced also in an abrasion resistance.

TABLE 24

| | Example | | Comparative Example | | Example | |
|---|---|---|---|---|---|---|
| | 87 | 88 | 75 | 76 | 89 | 90 |
| Composition (parts by weight) | | | | | | |
| NR | — | — | — | — | — | — |
| 0120*5 | 94.5 | 94.5 | 94.5 | 94.5 | 94.5 | 94.5 |
| BR01 | 30 | 30 | 30 | 30 | 30 | 30 |
| Aromatic oil | 5.5 | 5.5 | 5.5 | 5.5 | 5.5 | 5.5 |
| Silica (Nipsil AQ) | 30 | 30 | 30 | 30 | 30 | 30 |
| Carbon black | | | | | | |
| Blend amount | 30 | 30 | 30 | 30 | 30 | 30 |
| Type | N134 | N134 | N134 | N134 | N134 | N134 |
| Silane coupling agent Si69 | 1.5 | 1.5 | 1.5 | 1.5 | 1.5 | 1.5 |
| Alkoxyl-modified silicone oil | | | | | | |
| A | 3.0 | 6 | 8 | 0.6 | — | — |
| B | — | — | — | — | 3.0 | — |
| C | — | — | — | — | — | — |
| D | — | — | — | — | — | — |
| E | — | — | — | — | — | — |
| Evaluation | | | | | | |
| E' (index) | 114 | 105 | 102 | 101 | 114 | 110 |
| Abrasion resistance (index) | 106 | 103 | 96 | 97 | 108 | 106 |
| Wet skid resistance (index) | 103 | 103 | 102 | 100 | 102 | 101 |

TABLE 24-continued

| | Comparative Example | | Example | | |
|---|---|---|---|---|---|
| | 77 | 78 | 91 | 92 | 93 |
| Composition (parts by weight) | | | | | |
| NR | — | — | 40 | — | — |
| 0120*5 | 94.5 | 94.5 | 81 | 94.5 | 94.5 |
| BR01 | 30 | 30 | — | 30 | 30 |
| Aromatic oil | 5.5 | 5.5 | 9 | 5.5 | 5.5 |
| Silica (Nipsil AQ) | 30 | 30 | 30 | 27 | 30 |
| Carbon black | | | | | |
| Blend amount | 30 | 30 | 30 | 30 | 27 |
| Type | N134 | N134 | N134 | N134 | N134 |
| Silane coupling agent Si69 | 1.5 | 1.5 | 1.5 | — | — |
| Alkoxyl-modified silicone oil | | | | | |
| A | — | — | 3.0 | 3.0*6 | 3.0*7 |
| B | — | — | — | — | — |
| C | 3.0 | — | — | — | — |
| D | — | 3.0 | — | — | — |
| E | — | — | 3.0 | — | — |
| Evaluation | | | | | |
| E' (index) | 105 | 102 | 115 | 115 | 114 |
| Abrasion resistance (index) | 98 | 96 | 102 | 105 | 106 |
| Wet skid resistance (index) | 101 | 100 | 102 | 104 | 104 |

*5 Emulsion-polymerized styrene-butadiene rubber having a styrene content of 35% (oil-extended with aromatic oil of 37.5 parts by weight).
*6 Silica obtained by carrying Sample A on Nipsil AQ in a ratio 1:1 was used in an amount of 6 parts by weight. To be specific, 100 g of Nipsil AQ was put in a Henschel mixer, and 100 g of silicone oil was added thereto. The mixture was stirred at room temperature for 10 minutes to obtain a silica sample carrying the silicone oil.
*7 Silica obtained by carrying Sample A on N134 in a ratio 1:1 was used in an amount of 6 parts by weight. To be specific, 100 g of carbon black (N134) was put in a Henschel mixer, and 100 g of silicone oil was added thereto. The mixture was stirred at room temperature for 10 minutes to obtain a silica sample carrying the silicone oil.

Comparative Examples 78 to 88 and Examples 94 to 105

Rubber compositions were prepared in the recipes shown in the following Tables 26 and 27 according to the basic recipe shown in Table 1 described previously. Shown respectively are various carbon blacks in Table 21 and various epoxy-modified silicone oils in the following Table 25 each of which is used for the above compositions.

TABLE 25

$$(CH_3)_3Si-O-\left(\begin{array}{c}CH_3\\|\\Si-O\\|\\CH_3\end{array}\right)_r\left(\begin{array}{c}CH_3\\|\\Si-O\\|\\(CH_2)_3OCH_2-CH-CH_2\\\diagdown\!\!\diagup\\O\end{array}\right)_s Si-(CH_3)_3$$

| | r | s | r + s | s/(r + s) |
|---|---|---|---|---|
| Sample A | 21 | 14 | 35 | 0.40 |
| Sample B | 46 | 52 | 98 | 0.53 |

TABLE 25-continued $$(CH_3)_3Si-O-\left(\begin{array}{c}CH_3\\|\\Si-O\\|\\CH_3\end{array}\right)_r\left(\begin{array}{c}CH_3\\|\\Si-O\\|\\(CH_2)_3OCH_2-CH-CH_2\\\diagdown\!\!\diagup\\O\end{array}\right)_s Si-(CH_3)_3$$

| | r | s | r + s | s/(r + s) |
|---|---|---|---|---|
| Sample C | 116 | 107 | 213 | 0.50 |
| Sample D | 24 | 4 | 28 | 0.14 |

The rubber compositions obtained in the examples and the comparative examples were evaluated for a dynamic storage elastic modulus (E'), an abrasion resistance and a wet skid resistance by the evaluation methods described previously.

TABLE 26

| | Comparative Example | Example | Comparative Example | Example |
|---|---|---|---|---|
| | 78 | 79 | 94 | 95 | 80 | 81 | 96 |

| Composition (parts by weight) | | | | | | | |
|---|---|---|---|---|---|---|---|
| NR | — | — | — | — | — | — | — |
| 0120*¹ | 94.5 | 94.5 | 94.5 | 94.5 | 94.5 | 94.5 | 94.5 |
| BR01*¹ | 30 | 30 | 30 | 30 | 30 | 30 | 30 |
| Aromatic oil | 5.5 | 5.5 | 5.5 | 5.5 | 5.5 | 5.5 | 5.5 |
| Silica (Nipsil AQ)*² | 30 | 60 | 30 | 30 | 30 | 30 | 25 |
| Carbon black*³ | | | | | | | |
| Blend amount | 30 | — | 30 | 30 | 30 | 30 | 30 |
| Type | N134 | — | N134 | N134 | N134 | N134 | N134 |
| Silane coupling agent Si69*⁴ | 1.5 | 3 | 1.5 | 1.5 | 1.5 | 1.5 | 1.25 |
| Epoxy-modified silicone oil | | | | | | | |
| A | — | — | 1.5 | 1.5 | 1.5 | 1.5 | 2.5 |
| B | — | — | — | — | — | — | — |
| C | — | — | — | — | — | — | — |
| D | — | — | — | — | — | — | — |
| Evaluation | | | | | | | |
| E' (index) | 100 | 87 | 106 | 102 | 94 | 95 | 106 |
| Abrasion resistance (index) | 100 | 84 | 106 | 102 | 96 | 101 | 105 |
| Wet skid resistance (index) | 100 | 118 | 102 | 100 | 96 | 97 | 102 |

| | Comparative Example | Example | Comparative Example | Example | Comparative Example |
|---|---|---|---|---|---|
| | 82 | 97 | 98 | 83 | 99 | 84 |

| Composition (parts by weight) | | | | | | |
|---|---|---|---|---|---|---|
| NR | — | — | — | — | — | — |
| 0120*¹ | 94.5 | 94.5 | 94.5 | 94.5 | 94.5 | 94.5 |
| BR01*¹ | 30 | 30 | 30 | 30 | 30 | 30 |
| Aromatic oil | 5.5 | 5.5 | 5.5 | 5.5 | 5.5 | 5.5 |
| Silica (Nipsil AQ)*² | 15 | 20 | 20 | 30 | 60 | 70 |
| Carbon black*³ | | | | | | |
| Blend amount | 30 | 80 | 80 | 100 | 20 | 10 |
| Type | N134 | N134 | N134 | N134 | N134 | N134 |
| Silane coupling agent Si69*⁴ | 0.75 | 1.0 | 1.0 | 1.5 | 3.0 | 3.5 |
| Epoxy-modified silicone oil | | | | | | |
| A | 1.5 | 2.0 | 2.0 | 3.0 | 6.0 | 8.0 |
| B | — | — | — | — | — | — |
| C | — | — | — | — | — | — |
| D | — | — | — | — | — | — |
| Evaluation | | | | | | |
| E' (index) | 102 | 118 | 110 | 138 | 105 | 108 |
| Abrasion resistance (index) | 98 | 122 | 108 | 92 | 104 | 94 |
| Wet skid resistance (index) | 98 | 103 | 101 | 106 | 118 | 124 |

*¹manufactured by Japan Synthetic Rubber Co., Ltd.
*²manufactured by Nippon Silica Ind. Co., Ltd.
*³manufactured by Tokai Carbon Co., Ltd.
*⁴bis(3-triethoxysilylpropyl)tetrasulfide manufactured by Degussa AG.

In the comparative examples, the Mooney viscosities are high, and therefore the kneaded rubbers have very bad surfaces. Further, they are inferior in the dispersibility of carbon black and therefore reduced also in an abrasion resistance.

TABLE 27

| | Example | Comparative Example | Example |
|---|---|---|---|
| | 100 | 101 | 85 | 86 | 102 |

| Composition (parts by weight) | | | | | |
|---|---|---|---|---|---|
| NR | — | — | — | — | — |
| 0120*⁵ | 94.5 | 94.5 | 94.5 | 94.5 | 94.5 |
| BR01 | 30 | 30 | 30 | 30 | 30 |
| Aromatic oil | 5.5 | 5.5 | 5.5 | 5.5 | 5.5 |
| Silica (Nipsil AQ) | 30 | 30 | 30 | 30 | 30 |
| Carbon black | | | | | |
| Blend amount | 30 | 30 | 30 | 30 | 30 |
| Type | N134 | N134 | N134 | N134 | N134 |
| Silane coupling agent Si69 | 1.5 | 1.5 | 1.5 | 1.5 | 1.5 |
| Epoxy-modified silicone oil | | | | | |
| A | 3.0 | 6 | 8 | 0.6 | — |
| B | — | — | — | — | 3.0 |
| C | — | — | — | — | — |
| D | — | — | — | — | — |
| Evaluation | | | | | |
| E' (index) | 110 | 106 | 101 | 98 | 112 |
| Abrasion resistance (index) | 105 | 102 | 97 | 95 | 104 |
| Wet skid resistance (index) | 101 | 101 | 100 | 99 | 102 |

| | Comparative Example | Example | | |
|---|---|---|---|---|
| | 87 | 88 | 103 | 104 | 105 |

| Composition (parts by weight) | | | | | |
|---|---|---|---|---|---|
| NR | — | — | 40 | — | — |
| 0120*⁵ | 94.5 | 94.5 | 81 | 94.5 | 94.5 |
| BR01 | 30 | 30 | — | 30 | 30 |
| Aromatic oil | 5.5 | 5.5 | 9 | 5.5 | 5.5 |
| Silica | 30 | 30 | 30 | 27 | 30 |

TABLE 27-continued

|  |  |  |  |  |  |
|---|---|---|---|---|---|
| (Nipsil AQ) Carbon black |  |  |  |  |  |
| Blend amount | 30 | 30 | 30 | 30 | 27 |
| Type | N134 | N134 | N134 | N134 | N134 |
| Silane coupling agent Si69 | 1.5 | 1.5 | 1.5 | — | — |
| Alkoxyl-modified silicone oil |  |  |  |  |  |
| A | — | — | 3.0 | 3.0*[6] | 3.0*[7] |
| B | 3.0 | — | — | — | — |
| C | — | 3.0 | — | — | — |
| D | — | — | 3.0 | — | — |
| Evaluation |  |  |  |  |  |
| E' (index) | 104 | 102 | 110 | 108 | 109 |
| Abrasion resistance (index) | 94 | 94 | 102 | 104 | 104 |
| Wet skid resistance (index) | 102 | 100 | 103 | 103 | 102 |

*[5]Emulsion-polymerized styrene-butadiene rubber having a styrene content of 35% (oil-extended with aromatic oil of 37.5 parts by weight).
*[6]Silica obtained by carrying Sample A on Nipsil AQ in a ratio 1:1 was used in an amount of 6 parts by weight. To be specific, 100 g of Nipsil AQ was put in a Henschel mixer, and 100 g of silicone oil was added thereto. The mixture was stirred at room temperature for 10 minutes to obtain a silica sample carrying the silicone oil.
*[7]Silica obtained by carrying Sample A on N134 in a ratio 1:1 was used in an amount of 6 parts by weight. To be specific, 100 g of carbon black (N134) was put in a Henschel mixer, and 100 g of silicone oil was added thereto. The mixture was stirred at room temperature for 10 minutes to obtain a silica sample carrying the silicone oil.

Comparative Examples 89 to 99 and Examples 106 to 118

Rubber compositions were prepared in the recipes shown in the following Tables 29 and 30 according to the basic recipe shown in Table 1 described previously. Shown respectively are various carbon blacks in Table 21 and various amine-modified silicone oils in the following Table 28 each of which is used for the above compositions.

TABLE 28

$$(CH_3)_3Si-O-\left(\begin{array}{c}CH_3\\|\\Si-O\\|\\CH_3\end{array}\right)_m\left(\begin{array}{c}CH_3\\|\\Si-O\\|\\(CH_2)_3NH_2\end{array}\right)_n-Si-(CH_3)_3$$

|  | m | n | m + n | n/(m + n) |
|---|---|---|---|---|
| Sample A | 27 | 6 | 33 | 0.18 |
| Sample B | 13 | 13 | 26 | 0.50 |
| Sample C | 59 | 33 | 92 | 0.36 |
| Sample D | 139 | 93 | 232 | 0.40 |
| Sample E | 43 | 6 | 49 | 0.12 |

The rubber compositions obtained in the examples and the comparative examples were evaluated for a dynamic storage elastic modulus (E'), an abrasion resistance and a wet skid resistance by the evaluation methods described previously.

TABLE 29

|  | Comparative Example | | Example | | Comparative Example | | Example |
|---|---|---|---|---|---|---|---|
|  | 89 | 90 | 106 | 107 | 91 | 92 | 108 |
| Composition (parts by weight) |  |  |  |  |  |  |  |
| NR 0120*[1] | 94.5 | 94.5 | 94.5 | 94.5 | 94.5 | 94.5 | 94.5 |
| BR01*[1] | 30 | 30 | 30 | 30 | 30 | 30 | 30 |
| Aromatic oil | 5.5 | 5.5 | 5.5 | 5.5 | 5.5 | 5.5 | 5.5 |
| Silica (Nipsil AQ)*[2] | 30 | 60 | 30 | 30 | 30 | 30 | 25 |
| Carbon black*[3] |  |  |  |  |  |  |  |
| Blend amount | 30 | — | 30 | 30 | 30 | 30 | 30 |
| Type | N134 | — | N134 | N134 | N134 | N134 | N134 |
| Silane coupling agent Si69*[4] | 1.5 | 3 | 1.5 | 1.5 | 1.5 | 1.5 | 1.25 |
| Amine-modified silicone oil |  |  |  |  |  |  |  |
| A | — | — | 1.5 | 1.5 | 1.5 | 1.5 | 2.5 |
| B | — | — | — | — | — | — | — |
| C | — | — | — | — | — | — | — |
| D | — | — | — | — | — | — | — |
| E | — | — | — | — | — | — | — |
| Evaluation |  |  |  |  |  |  |  |
| E' (index) | 100 | 87 | 108 | 103 | 94 | 97 | 107 |
| Abrasion resistance (index) | 100 | 84 | 106 | 102 | 94 | 102 | 104 |
| Wet skid resistance (index) | 100 | 118 | 102 | 100 | 96 | 98 | 103 |

|  | Comparative Example | Example | Comparative Example | Example | Comparative Example |
|---|---|---|---|---|---|
|  | 93 | 109 | 110 | 94 | 111 | 95 |
| Composition (parts by weight) |  |  |  |  |  |  |
| NR 0120*[1] | 94.5 | 94.5 | 94.5 | 94.5 | 94.5 | 94.5 |
| BR01*[1] | 30 | 30 | 30 | 30 | 30 | 30 |
| Aromatic oil | 5.5 | 5.5 | 5.5 | 5.5 | 5.5 | 5.5 |
| Silica (Nipsil AQ)*[2] | 15 | 20 | 20 | 30 | 60 | 70 |
| Carbon black*[3] |  |  |  |  |  |  |
| Blend amount | 30 | 80 | 80 | 100 | 20 | 10 |
| Type | N134 | N134 | N134 | N134 | N134 | N134 |
| Silane coupling agent Si69*[4] | 0.75 | 1.0 | 1.0 | 1.5 | 3.0 | 3.5 |
| Amine-modified silicone oil |  |  |  |  |  |  |
| A | 1.5 | 2.0 | 2.0 | 3.0 | 6.0 | 8.0 |
| B | — | — | — | — | — | — |
| C | — | — | — | — | — | — |
| D | — | — | — | — | — | — |
| E | — | — | — | — | — | — |
| Evaluation |  |  |  |  |  |  |
| E' (index) | 100 | 120 | 112 | 134 | 107 | 109 |
| Abrasion resistance (index) | 94 | 126 | 116 | 91 | 106 | 92 |
| Wet skid resistance (index) | 101 | 102 | 102 | 104 | 121 | 126 |

*[1]manufactured by Japan Synthetic Rubber Co., Ltd.
*[2]manufactured by Nippon Silica Ind. Co., Ltd.
*[3]manufactured by Tokai Carbon Co., Ltd.
*[4]Bis(3-triethoxysilylpropyl)tetrasulfide manufactured by Degussa AG.

In the comparative examples, the Mooney viscosities are high, and therefore the kneaded rubbers have very bad surfaces. Further, they are inferior in the dispersibility of carbon black and therefore reduced also in an abrasion resistance.

TABLE 30

|  | Example | | Comparative Example | | Example | |
|---|---|---|---|---|---|---|
|  | 112 | 113 | 96 | 97 | 114 | 115 |
| Composition (parts by weight) | | | | | | |
| NR | — | — | — | — | — | — |
| 0120*5 | 94.5 | 94.5 | 94.5 | 94.5 | 94.5 | 94.5 |
| BR01 | 30 | 30 | 30 | 30 | 30 | 30 |
| Aromatic oil | 5.5 | 5.5 | 5.5 | 5.5 | 5.5 | 5.5 |
| Silica (Nipsil AQ) | 30 | 30 | 30 | 30 | 30 | 30 |
| Carbon black | | | | | | |
| Blend amount | 30 | 30 | 30 | 30 | 30 | 30 |
| Type | N134 | N134 | N134 | N134 | N134 | N134 |
| Silane coupling agent Si69 | 1.5 | 1.5 | 1.5 | 1.5 | 1.5 | 1.5 |
| Amine-modified silicone oil | | | | | | |
| A | 3.0 | 6 | 8 | 0.6 | — | — |
| B | — | — | — | — | 3.0 | — |
| C | — | — | — | — | — | 3.0 |
| D | — | — | — | — | — | — |
| E | — | — | — | — | — | — |
| Evaluation | | | | | | |
| E' (index) | 112 | 104 | 102 | 99 | 114 | 111 |
| Abrasion resistance (index) | 104 | 102 | 95 | 95 | 106 | 104 |
| Wet skid resistance (index) | 102 | 102 | 101 | 100 | 103 | 102 |

|  | Comparative Example | | Example | | |
|---|---|---|---|---|---|
|  | 98 | 99 | 116 | 117 | 118 |
| Composition (parts by weight) | | | | | |
| NR | — | — | 40 | — | — |
| 0120*5 | 94.5 | 94.5 | 81 | 94.5 | 94.5 |
| BR01 | 30 | 30 | — | 30 | 30 |
| Aromatic oil | 5.5 | 5.5 | 9 | 5.5 | 5.5 |
| Silica (Nipsil AQ) | 30 | 30 | 30 | 27 | 30 |
| Carbon black | | | | | |
| Blend amount | 30 | 30 | 30 | 30 | 27 |
| Type | N134 | N134 | N134 | N134 | N134 |
| Silane coupling agent Si69 | 1.5 | 1.5 | 1.5 | — | — |
| Amine-modified agent Si69 | | | | | |
| A | — | — | 3.0 | 3.0*6 | 3.0*7 |
| B | — | — | — | — | — |
| C | — | — | — | — | — |
| D | 3.0 | — | — | — | — |
| E | — | 3.0 | — | — | — |
| Evaluation | | | | | |
| E' (index) | 106 | 101 | 115 | 114 | 112 |
| Abrasion resistance (index) | 96 | 95 | 102 | 106 | 106 |

TABLE 30-continued

| Wet skid resistance (index) | 100 | 102 | 102 | 103 | 102 |

*5Emulsion-polymerized styrene-butadiene rubber having a styrene content of 35% (oil-extended with aromatic oil of 37.5 parts by weigh).
*6Silica obtained by carrying Sample A on Nipsil AQ in a ratio 1:1 was used in an amount of 6 parts by weight. To be specific, 100 g of Nipsil AQ was put in a Henschel mixer, and 100 g of silicone oil was added thereto. The mixture was stirred at room temperature for 10 minutes to obtain a silica sample carrying the silicone oil.
*7Silica obtained by carrying Sample A on N134 in a ratio 1:1 was used in an amount of 6 parts by weight. To be specific, 100 g of carbon black (N134) was put in a Henschel mixer, and 100 g of silicone oil was added thereto. The mixture was stirred at room temperature for 10 minutes to obtain a silica sample carrying the silicone oil.

Comparative Examples 100 to 110 and Examples 119 to 131

Rubber compositions were prepared in the recipes shown in the following Tables 32 and 33 according to the basic recipe shown in Table 1 described previously. Shown respectively are various carbon blacks in Table 21 and various fatty acid ester-modified silicone oils in the following Table 31 each of which is used for the above compositions.

TABLE 31

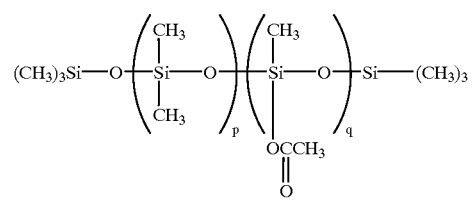

|  | p | q | p + q | q/(p + q) |
|---|---|---|---|---|
| Sample A | 32 | 7 | 39 | 0.18 |
| Sample B | 17 | 21 | 38 | 0.55 |
| Sample C | 67 | 30 | 97 | 0.31 |
| Sample D | 150 | 72 | 222 | 0.32 |
| Sample E | 38 | 5 | 43 | 0.12 |

The rubber compositions obtained in the examples and the comparative examples were evaluated for a dynamic storage elastic modulus (E'), an abrasion resistance and a wet skid resistance by the evaluation methods described previously.

TABLE 32

|  | Comparative Example | | Example | | Comparative Example | | Example |
|---|---|---|---|---|---|---|---|
|  | 100 | 101 | 119 | 120 | 102 | 103 | 121 |
| Composition (parts by weight) | | | | | | | |
| NR | — | — | — | — | — | — | — |
| 0120*1 | 94.5 | 94.5 | 94.5 | 94.5 | 94.5 | 94.5 | 94.5 |
| BR01*1 | 30 | 30 | 30 | 30 | 30 | 30 | 30 |
| Aromatic oil | 5.5 | 5.5 | 5.5 | 5.5 | 5.5 | 5.5 | 5.5 |
| Silica (Nipsil AQ)*2 | 30 | 60 | 30 | 30 | 30 | 30 | 25 |
| Carbon black*3 | | | | | | | |
| Blend amount | 30 | — | 30 | 30 | 30 | 30 | 30 |
| Type | N134 | — | N134 | N134 | N134 | N134 | N134 |
| Silane coupling agent Si69*4 | 1.5 | 3 | 1.5 | 1.5 | 1.5 | 1.5 | 1.25 |

TABLE 32-continued

|  | | | | | | | |
|---|---|---|---|---|---|---|---|
| Fatty acid ester-modified silicone oil | | | | | | | |
| A | — | — | 1.5 | 1.5 | 1.5 | 1.5 | 2.5 |
| B | — | — | — | — | — | — | — |
| C | — | — | — | — | — | — | — |
| D | — | — | — | — | — | — | — |
| E | — | — | — | — | — | — | — |
| Evaluation | | | | | | | |
| E' (index) | 100 | 87 | 110 | 105 | 96 | 98 | 106 |
| Abrasion resistance (index) | 100 | 84 | 107 | 102 | 95 | 103 | 103 |
| Wet skid resistance (index) | 100 | 118 | 105 | 102 | 93 | 96 | 103 |

|  | Comparative Example 104 | Example 122 | Example 123 | Comparative Example 105 | Example 124 | Comparative Example 106 |
|---|---|---|---|---|---|---|
| NR | — | — | — | — | — | — |
| 0120*1 | 94.5 | 94.5 | 94.5 | 94.5 | 94.5 | 94.5 |
| BR01*1 | 30 | 30 | 30 | 30 | 30 | 30 |
| Aromatic oil | 5.5 | 5.5 | 5.5 | 5.5 | 5.5 | 5.5 |
| Silica (Nipsil AQ)*2 | 15 | 20 | 20 | 30 | 60 | 70 |
| Carbon black*3 | | | | | | |
| Blend amount | 30 | 80 | 80 | 100 | 20 | 10 |
| Type | N134 | N134 | N134 | N134 | N134 | N134 |
| Silane coupling agent Si69*4 | 0.75 | 1.0 | 1.0 | 1.5 | 3.0 | 3.5 |
| Fatty acid ester-modified silicone oil | | | | | | |
| A | 1.5 | 2.0 | 2.0 | 3.0 | 6.0 | 8.0 |
| B | — | — | — | — | — | — |
| C | — | — | — | — | — | — |
| D | — | — | — | — | — | — |
| Evaluation | | | | | | |
| E' (index) | 101 | 118 | 112 | 139 | 108 | 102 |
| Abrasion resistance (index) | 98 | 120 | 114 | 94 | 105 | 94 |
| Wet skid resistance (index) | 96 | 104 | 101 | 108 | 122 | 124 |

*1 manufactured by Japan Synthetic Rubber Co., Ltd.
*2 manufactured by Nippon Silica Ind. Co., Ltd.
*3 manufactured by Tokai Carbon Co., Ltd.
*4 Bis(3-triethoxysilylpropyl)tetrasulfide manufactured by Degussa AG.

In the comparative examples, the Mooney viscosities are high, and therefore the kneaded rubbers have very bad surfaces. Further, they are inferior in the dispersibility of carbon black and therefore reduced also in an abrasion resistance.

TABLE 33

|  | Example | | Comparative Example | | Example | |
|---|---|---|---|---|---|---|
|  | 125 | 126 | 107 | 108 | 127 | 128 |
| Composition (parts by weight) | | | | | | |
| NR | — | — | — | — | — | — |
| 0120*5 | 94.5 | 94.5 | 94.5 | 94.5 | 94.5 | 94.5 |
| BR01 | 30 | 30 | 30 | 30 | 30 | 30 |
| Aromatic oil | 5.5 | 5.5 | 5.5 | 5.5 | 5.5 | 5.5 |

TABLE 33-continued

|  | | | | | | |
|---|---|---|---|---|---|---|
| Silica (Nipsil AQ) | 30 | 30 | 30 | 30 | 30 | 30 |
| Carbon black | | | | | | |
| Blend amount | 30 | 30 | 30 | 30 | 30 | 30 |
| Type | N134 | N134 | N134 | N134 | N134 | N134 |
| Silane coupling agent Si69 | 1.5 | 1.5 | 1.5 | 1.5 | 1.5 | 1.5 |
| Fatty acid ester-modified silicone oil | | | | | | |
| A | 3.0 | 6 | 8 | 0.6 | — | — |
| B | — | — | — | — | 3.0 | — |
| C | — | — | — | — | — | 3.0 |
| D | — | — | — | — | — | — |
| Evaluation | | | | | | |
| E' (index) | 112 | 108 | 104 | 102 | 110 | 108 |
| Abrasion resistance (index) | 105 | 102 | 95 | 96 | 106 | 106 |
| Wet skid resistance (index) | 102 | 102 | 101 | 100 | 101 | 102 |

|  | Comparative Example | | Example | | |
|---|---|---|---|---|---|
|  | 109 | 110 | 129 | 130 | 131 |
| Composition (parts by weight) | | | | | |
| NR | — | — | 40 | — | — |
| 0120*5 | 94.5 | 94.5 | 81 | 94.5 | 94.5 |
| BR01 | 30 | 30 | — | 30 | 30 |
| Aromatic oil | 5.5 | 5.5 | 9 | 5.5 | 5.5 |
| Silica (Nipsil AQ) | 30 | 30 | 30 | 27 | 30 |
| Carbon black | | | | | |
| Blend amount | 30 | 30 | 30 | 30 | 27 |
| Type | N134 | N134 | N134 | N134 | N134 |
| Silane coupling agent Si69 | 1.5 | 1.5 | 1.5 | — | — |
| Fatty acid ester-modified silicone oil | | | | | |
| A | — | — | 3.0 | 3.0*6 | 3.0*7 |
| B | — | — | — | — | — |
| C | — | — | — | — | — |
| D | 3.0 | — | — | — | — |
| E | — | 3.0 | — | — | — |
| Evaluation | | | | | |
| E' (index) | 104 | 100 | 115 | 114 | 112 |
| Abrasion resistance (index) | 96 | 94 | 102 | 105 | 104 |
| Wet skid resistance (index) | 100 | 99 | 104 | 103 | 104 |

*5 Emulsion-polymerized styrene-butadiene rubber having a styrene content of 35% (oil-extended with aromatic oil of 37.5 parts by weight).
*6 Silica obtained by carrying Sample A on Nipsil AQ in a ratio 1:1 was used in an amount of 6 parts by weight. To be specific, 100 g of Nipsil AQ was put in a Henschel mixer, and 100 g of silicone oil was added thereto. The mixture was stirred at room temperature for 10 minutes to obtain a silica sample carrying the silicone oil.
*7 Silica obtained by carrying Sample A on N134 in a ratio 1:1 was used in an amount of 6 parts by weight. To be specific, 100 g of carbon black (N134) was put in a Henschel mixer, and 100 g of silicone oil was added thereto. The mixture was stirred at room temperature for 10 minutes to obtain a silica sample carrying the silicone oil.

Comparative Examples 111 to 120 and Examples 132 to 144

Rubber compositions were prepared in the recipes shown in the following Tables 35 and 36 according to the basic recipe shown in Table 1 described previously. Shown respectively are various carbon blacks in Table 21 and various α,ω-dihydroxypolydimethylsiloxanes in the following Table 34 each of which is used for the above compositions.

TABLE 34

$$HO-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_g H$$

| | g |
|---|---|
| Sample A | 10 |
| Sample B | 40 |
| Sample C | 70 |
| Sample D | 120 |

The rubber compositions obtained in the examples and the comparative examples were evaluated for a dynamic storage elastic modulus (E'), an abrasion resistance and a wet skid resistance by the evaluation methods described previously.

TABLE 35

| | Comparative Example | | Example | | Comparative Example | | Example |
|---|---|---|---|---|---|---|---|
| | 111 | 112 | 132 | 133 | 113 | 114 | 134 |
| Composition (parts by weight) | | | | | | | |
| NR 0120*¹ | — | — | — | — | — | — | — |
| BR01*¹ | 94.5 | 94.5 | 94.5 | 94.5 | 94.5 | 94.5 | 94.5 |
| | 30 | 30 | 30 | 30 | 30 | 30 | 30 |
| Aromatic oil | 5.5 | 5.5 | 5.5 | 5.5 | 5.5 | 5.5 | 5.5 |
| Silica (Nipsil AQ)*² | 30 | 60 | 30 | 30 | 30 | 30 | 25 |
| Carbon black*³ | | | | | | | |
| Blend amount | 30 | — | 30 | 30 | 30 | 30 | 30 |
| Type | N134 | — | N134 | N134 | N134 | N134 | N134 |
| Silane coupling agent Si69*⁴ | 1.5 | 3 | 1.5 | 1.5 | 1.5 | 1.5 | 1.25 |
| α,ω-Dihydroxy-polydimethyl-siloxane | | | | | | | |
| A | — | — | 1.5 | 1.5 | 1.5 | 1.5 | 2.5 |
| B | — | — | — | — | — | — | — |
| C | — | — | — | — | — | — | — |
| D | — | — | — | — | — | — | — |
| Evaluation | | | | | | | |
| E' (index) | 100 | 87 | 114 | 106 | 96 | 99 | 112 |
| Abrasion resistance (index) | 100 | 84 | 108 | 104 | 94 | 106 | 106 |
| Wet skid resistance (index) | 100 | 118 | 104 | 104 | 95 | 98 | 102 |

| | Comparative Example | Example | | Comparative Example | Example | Comparative Example |
|---|---|---|---|---|---|---|
| | 115 | 135 | 136 | 116 | 137 | 117 |
| Composition (parts by weight) | | | | | | |
| NR 0120*¹ | — | — | — | — | — | — |
| BR01*¹ | 94.5 | 94.5 | 94.5 | 94.5 | 94.5 | 94.5 |
| | 30 | 30 | 30 | 30 | 30 | 30 |
| Aromatic oil | 5.5 | 5.5 | 5.5 | 5.5 | 5.5 | 5.5 |
| Silica | 15 | 20 | 20 | 30 | 60 | 70 |

TABLE 35-continued

| (Nipsil AQ)*² Carbon black*³ | | | | | | |
|---|---|---|---|---|---|---|
| Blend amount | 30 | 80 | 80 | 100 | 20 | 10 |
| Type | N134 | N134 | N134 | N134 | N134 | N134 |
| Silane coupling agent Si69*⁴ | 0.75 | 1.0 | 1.0 | 1.5 | 3.0 | 3.5 |
| α,ω-Dihydroxy-polydimethyl-siloxane | | | | | | |
| A | 1.5 | 2.0 | 2.0 | 3.0 | 6.0 | 8.0 |
| B | — | — | — | — | — | — |
| C | — | — | — | — | — | — |
| D | — | — | — | — | — | — |
| Evaluation | | | | | | |
| E' (index) | 102 | 123 | 118 | 130 | 116 | 104 |
| Abrasion resistance (index) | 92 | 122 | 114 | 88 | 106 | 92 |
| Wet skid resistance (index) | 98 | 106 | 101 | 106 | 116 | 122 |

*¹manufactured by Japan Synthetic Rubber Co., Ltd.
*²manufactured by Nippon Silica Ind. Co., Ltd.
*³manufactured by Tokai Carbon Co., Ltd.
*⁴Bis(3-triethoxysilylpropyl)tetrasulfide manufactured by Degussa AG.

In the comparative examples, the Mooney viscosities are high, and therefore the kneaded rubbers have very bad surfaces. Further, they are inferior in the dispersibility of carbon black and therefore reduced also in an abrasion resistance.

TABLE 36

| | Example | | Comparative Example | | Example | |
|---|---|---|---|---|---|---|
| | 138 | 139 | 118 | 119 | 140 | 141 |
| Composition (parts by weight) | | | | | | |
| NR 0120*⁵ | — | — | — | — | — | — |
| BR01 | 94.5 | 94.5 | 94.5 | 94.5 | 94.5 | 94.5 |
| | 30 | 30 | 30 | 30 | 30 | 30 |
| Aromatic oil | 5.5 | 5.5 | 5.5 | 5.5 | 5.5 | 5.5 |
| Silica (Nipsil AQ) | 30 | 30 | 30 | 30 | 30 | 30 |
| Carbon black | | | | | | |
| Blend amount | 30 | 30 | 30 | 30 | 30 | 30 |
| Type | N134 | N134 | N134 | N134 | N134 | N134 |
| Silane coupling agent Si69 | 1.5 | 1.5 | 1.5 | 1.5 | 1.5 | 1.5 |
| α,ω-Dihydroxy-polydimethyl-siloxane | | | | | | |
| A | 3.0 | 6 | 8 | 0.6 | — | — |
| B | — | — | — | — | 3.0 | — |
| C | — | — | — | — | — | 3.0 |
| D | — | — | — | — | — | — |
| Evaluation | | | | | | |
| E' (index) | 118 | 112 | 106 | 100 | 112 | 106 |
| Abrasion resistance (index) | 108 | 104 | 97 | 98 | 104 | 101 |
| Wet skid resistance (index) | 104 | 102 | 100 | 100 | 102 | 102 |

TABLE 36-continued

|  | Comparative Example | Example | | |
|---|---|---|---|---|
|  | 120 | 142 | 143 | 144 |
| Composition (parts by weight) | | | | |
| NR | — | 40 | — | — |
| 0120*5 | 94.5 | 81 | 94.5 | 94.5 |
| BR01 | 30 | — | 30 | 30 |
| Aromatic oil | 5.5 | 9 | 5.5 | 5.5 |
| Silica (Nipsil AQ) | 30 | 30 | 27 | 30 |
| Carbon black | | | | |
| Blend amount | 30 | 30 | 30 | 27 |
| Type | N134 | N134 | N134 | N134 |
| Silane coupling agent Si69 | 1.5 | 1.5 | — | — |
| α,ω-Dihydroxy-polydimethyl-siloxane | | | | |
| A | — | 3.0 | 3.0*6 | 3.0*7 |
| B | — | — | — | — |
| C | — | — | — | — |
| D | 3.0 | — | — | — |
| Evaluation | | | | |
| E' (index) | 102 | 117 | 116 | 114 |
| Abrasion resistance (index) | 95 | 104 | 109 | 108 |
| Wet skid resistance (index) | 100 | 104 | 102 | 102 |

*5 Emulsion-polymerized styrene-butadiene rubber having a styrene content of 35% (oil-extended with aromatic oil of 37.5 parts by weight).
*6 Silica obtained by carrying Sample A on Nipsil AQ in a ratio 1:1 was used in an amount of 6 parts by weight. To be specific, 100 g of Nipsil AQ was put in a Henschel mixer, and 100 g of silicone oil was added thereto. The mixture was stirred at room temperature for 10 minutes to obtain a silica sample carrying the silicone oil.
*7 Silica obtained by carrying Sample A on N134 in a ratio 1:1 was used in an amount of 6 parts by weight. To be specific, 100 g of carbon black (N134) was put in a Henschel mixer, and 100 g of silicone oil was added thereto. The mixture was stirred at room temperature for 10 minutes to obtain a silica sample carrying the silicone oil.

Comparative Examples 121 to 131 and Examples 145 to 157

Rubber compositions were prepared in the recipes shown in the following Tables 38 and 39 according to the basic recipe shown in Table 1 described previously. Shown respectively are various carbon blacks in Table 21 and various hydrogen silicone oils in the following Table 37 each of which is used for the above compositions.

TABLE 37

$$(CH_3)_3Si-O-\left(\begin{array}{c}CH_3\\|\\Si-O\\|\\CH_3\end{array}\right)_v\left(\begin{array}{c}CH_3\\|\\Si-O\\|\\H\end{array}\right)_w Si-(CH_3)_3$$

|  | v | w | v + w | w/(v + w) |
|---|---|---|---|---|
| Sample A | 38 | 8 | 46 | 0.18 |
| Sample B | 32 | 26 | 58 | 0.45 |
| Sample C | 32 | 61 | 93 | 0.66 |
| Sample D | 124 | 82 | 206 | 0.40 |
| Sample E | 43 | 6 | 49 | 0.12 |

The rubber compositions obtained in the examples and the comparative examples were evaluated for a dynamic storage elastic modulus (E'), an abrasion resistance and a wet skid resistance by the evaluation methods described previously.

TABLE 38

|  | Comparative Example | | Example | | Comparative Example | | Example |
|---|---|---|---|---|---|---|---|
|  | 121 | 122 | 145 | 146 | 123 | 124 | 147 |
| Composition (parts by weight) | | | | | | | |
| NR | | | | | | | |
| 0120*1 | 94.5 | 94.5 | 94.5 | 94.5 | 94.5 | 94.5 | 94.5 |
| BR01*1 | 30 | 30 | 30 | 30 | 30 | 30 | 30 |
| Aromatic oil | 5.5 | 5.5 | 5.5 | 5.5 | 5.5 | 5.5 | 5.5 |
| Silica (Nipsil AQ)*2 | 30 | 60 | 30 | 30 | 30 | 30 | 25 |
| Carbon black*3 | | | | | | | |
| Blend amount | 30 | — | 30 | 30 | 30 | 30 | 30 |
| Type | N134 | — | N134 | N134 | N134 | N134 | N134 |
| Silane coupling agent Si69*4 | 1.5 | 3 | 1.5 | 1.5 | 1.5 | 1.5 | 1.25 |
| Hydrogen silicone oil | | | | | | | |
| A | — | — | 1.5 | 1.5 | 1.5 | 1.5 | 2.5 |
| B | — | — | — | — | — | — | — |
| C | — | — | — | — | — | — | — |
| D | — | — | — | — | — | — | — |
| E | — | — | — | — | — | — | — |
| Evaluation | | | | | | | |
| E' (index) | 100 | 87 | 108 | 103 | 92 | 96 | 102 |
| Abrasion resistance (index) | 100 | 84 | 107 | 104 | 94 | 102 | 102 |
| Wet skid resistance (index) | 100 | 118 | 102 | 100 | 96 | 98 | 100 |

|  | Comparative Example | Example | Comparative Example | Example | Comparative Example |
|---|---|---|---|---|---|
|  | 125 | 148 | 149 | 126 | 150 | 127 |
| Composition (parts by weight) | | | | | | |
| NR | — | — | — | — | — | — |
| 0120*1 | 94.5 | 94.5 | 94.5 | 94.5 | 94.5 | 94.5 |
| BR01*1 | 30 | 30 | 30 | 30 | 30 | 30 |
| Aromatic oil | 5.5 | 5.5 | 5.5 | 5.5 | 5.5 | 5.5 |
| Silica (Nipsil AQ)*2 | 15 | 20 | 20 | 30 | 60 | 70 |
| Carbon black*3 | | | | | | |
| Blend amount | 30 | 80 | 80 | 100 | 20 | 10 |
| Type | N134 | N134 | N134 | N134 | N134 | N134 |
| Silane coupling agent Si69*4 | 0.75 | 1.0 | 1.0 | 1.5 | 3.0 | 3.5 |
| Hydrogen silicone oil | | | | | | |
| A | 1.5 | 2.0 | 2.0 | 3.0 | 6.0 | 8.0 |
| B | — | — | — | — | — | — |
| C | — | — | — | — | — | — |
| D | — | — | — | — | — | — |
| E | — | — | — | — | — | — |
| Evaluation | | | | | | |
| E' (index) | 97 | 117 | 112 | 134 | 104 | 98 |
| Abrasion resistance (index) | 97 | 122 | 118 | 88 | 102 | 95 |
| Wet skid resistance (index) | 96 | 104 | 102 | 108 | 122 | 125 |

*1 manufactured by Japan Synthetic Rubber Co., Ltd.
*2 manufactured by Nippon Silica Ind. Co., Ltd.
*3 manufactured by Tokai Carbon Co., Ltd.
*4 Bis(3-triethoxysilylpropyl)tetrasulfide manufactured by Degussa AG.

In the comparative examples, the Mooney viscosities are high, and therefore the kneaded rubbers have very bad surfaces. Further, they are inferior in the dispersibility of carbon black and therefore reduced also in an abrasion resistance.

TABLE 39

|  | Example | | Comparative Example | | Example | |
|---|---|---|---|---|---|---|
|  | 151 | 152 | 128 | 129 | 153 | 154 |
| Composition (parts by weight) | | | | | | |
| NR 0120*5 | 94.5 | 94.5 | 94.5 | 94.5 | 94.5 | 94.5 |
| BR01 | 30 | 30 | 30 | 30 | 30 | 30 |
| Aromatic oil | 5.5 | 5.5 | 5.5 | 5.5 | 5.5 | 5.5 |
| Silica (Nipsil AQ) | 30 | 30 | 30 | 30 | 30 | 30 |
| Carbon black | | | | | | |
| Blend amount | 30 | 30 | 30 | 30 | 30 | 30 |
| Type | N134 | N134 | N134 | N134 | N134 | N134 |
| Silane coupling agent Si69 | 1.5 | 1.5 | 1.5 | 1.5 | 1.5 | 1.5 |
| Hydrogen silicone oil | | | | | | |
| A | 3.0 | 6 | 8 | 0.6 | — | — |
| B | — | — | — | — | 3.0 | — |
| C | — | — | — | — | — | 3.0 |
| D | — | — | — | — | — | — |
| E | — | — | — | — | — | — |
| Evaluation | | | | | | |
| E' (index) | 110 | 108 | 106 | 101 | 110 | 107 |
| Abrasion resistance (index) | 104 | 102 | 98 | 98 | 106 | 108 |
| Wet skid resistance (index) | 103 | 102 | 102 | 100 | 102 | 103 |

|  | Comparative Example | | Example | | |
|---|---|---|---|---|---|
|  | 130 | 131 | 155 | 156 | 157 |
| Composition (parts by weight) | | | | | |
| NR | — | — | 40 | — | — |
| 0120*5 | 94.5 | 94.5 | 81 | 94.5 | 94.5 |
| BR01 | 30 | 30 | — | 30 | 30 |
| Aromatic oil | 5.5 | 5.5 | 9 | 5.5 | 5.5 |
| Silica (Nipsil AQ) | 30 | 30 | 30 | 27 | 30 |
| Carbon black | | | | | |
| Blend amount | 30 | 30 | 30 | 30 | 27 |
| Type | N134 | N134 | N134 | N134 | N134 |
| Silane coupling agent Si69 | 1.5 | 1.5 | 1.5 | — | — |
| Hydrogen silicone oil | | | | | |
| A | — | — | 3.0 | 3.0*6 | 3.0*7 |
| B | — | — | — | — | — |
| C | — | — | — | — | — |
| D | 3.0 | — | — | — | — |
| E | — | 3.0 | — | — | — |
| Evaluation | | | | | |
| E' (index) | 106 | 101 | 112 | 109 | 108 |
| Abrasion resistance (index) | 98 | 94 | 101 | 105 | 104 |

TABLE 39-continued

| Wet skid resistance (index) | 104 | 101 | 106 | 102 | 103 |

*5Emulsion-polymerized styrene-butadiene rubber having a styrene content of 35% (oil-extended with aromatic oil of 37.5 parts by weight).
*6Silica obtained by carrying Sample A on Nipsil AQ in a ratio 1:1 was used in an amount of 6 parts by weight. To be specific, 100 g of Nipsil AQ was put in a Henschel mixer, and 100 g of silicone oil was added thereto. The mixture was stirred at room temperature for 10 minutes to obtain a silica sample carrying the silicone oil.
*7Silica obtained by carrying Sample A on N134 in a ratio 1:1 was used in an amount of 6 parts by weight. To be specific, 100 g of carbon black (N134) was put in a Henschel mixer, and 100 g of silicone oil was added thereto. The mixture was stirred at room temperature for 10 minutes to obtain a silica sample carrying the silicone oil.

As explained above, in the rubber compositions of the present invention, effective vulcanization is carried out, the wet performance is improved and the abrasion resistance is improved as well by blending a prescribed amount of specific carbon black and a prescribed amount of silica and mixing a specific amount of the specific silicone oil as a dispersion-improving agent into the blended silica. In addition thereto, the dry performance is improved as well since the dynamic storage elastic modulus (E') goes up.

INDUSTRIAL APPLICABILITY

The rubber composition of the present invention can suitably be used for uses in which the processability (Mooney viscosity), the low heat generating property and the high abrasion resistance are required. In particular, it can suitably be applied to rubber products such as tires, conveyor belts and hoses.

What is claimed is:

1. A rubber composition prepared by blending 15 to 85 parts by weight of silica per 100 parts by weight of a rubber component comprising a natural rubber and/or diene base synthetic rubber and 1 to 15% by weight of a dispersion-improving agent based on the amount of said silica, wherein the dispersion-improving agent is a compound selected from the group consisting of silicone oils represented by formulae (IV) to (VII):

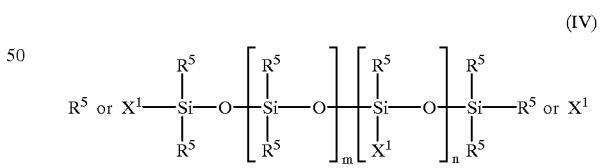

(IV)

wherein $R^5$ represents an alkyl group or a phenyl group; $1 \leq m+n \leq 200$ and $n/(m+n) \geq 0.15$; $X^1$ represents an amino group or an N-substituted amino group represented by $-R^1NR^2R^3$ or $-R^1NHR^4NR^2R^3$; $R^1$ and $R^4$ represent $-(CH_2)_n-$ (provided that n is 1, 2 or 3); $R^2$ and $R^3$ may be the same or different and represent a hydrogen atom, an alkyl group having 1 to 36 carbon atoms or a phenyl group; m and n represent the total number of the respective structural units and include a continuous one (block structure) and one disposed at random (random structure), (V)

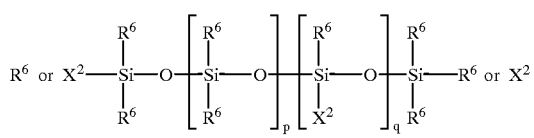

wherein $R^6$ represents an alkyl group or a phenyl group; $1 \leq p+q \leq 200$ and $q/(p+q) \geq 0.15$; $X^2$ represents a fatty acid ester group represented by $-OCOR^7$; $R^7$ represents an alkyl group or an alkenyl group each of which has 1 to 36 carbon atoms; p and q represent the total number of the respective structural units and include a continuous one (block structure) and one disposed at random (random structure), (VI)

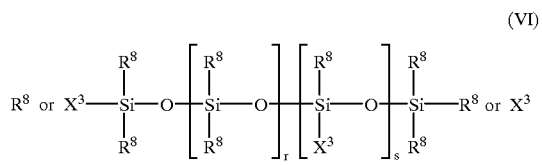

wherein $R^8$ represents an alkyl group or a phenyl group; $1 \leq r+s \leq 200$ and $r/(r+s) \geq 0.15$; $X^3$ represents an epoxy-containing group represented by

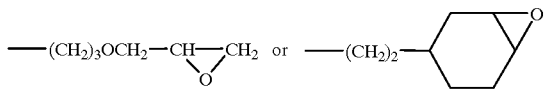

r and s represent the total number of the respective structural units and include a continuous one (block structure) and one disposed at random (random structure), (VII)

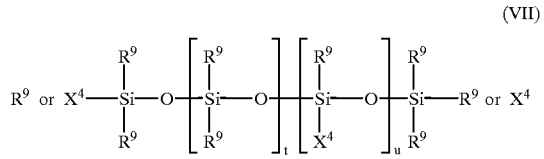

wherein $R^9$ represents an alkyl group or a phenyl group; $1 \leq t+u \leq 200$ and $u/(t+u) \geq 0.15$; $X^4$ represents an alkoxyl group; t and u represent the total number of the respective structural units and include a continuous one (block structure) and one disposed at random (random structure).

2. A rubber composition prepared by blending 15 to 85 parts by weight of silica per 100 parts by weight of a rubber component comprising natural rubber and/or diene base synthetic rubber and 1 to 15% by weight of a dispersion-improving agent based on the amount of said silica, wherein said dispersion-improving agent is a nitrogen-containing carbonyl compound represented by any of the following Formulas (I) to (III):

(I)

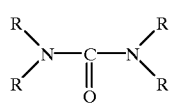

(II)

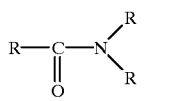

(III)

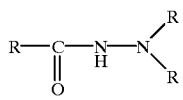

wherein R represents hydrogen, a linear or branched and saturated or unsaturated aliphatic hydrocarbon having 1 to 20 carbon atoms, an aromatic hydrocarbon or an alicyclic hydrocarbon and may be the same or different.

3. The rubber composition as described in claim 1, wherein said dispersion-improving agent is an amine-modified silicone oil represented by the following Formula (IV):

(IV)

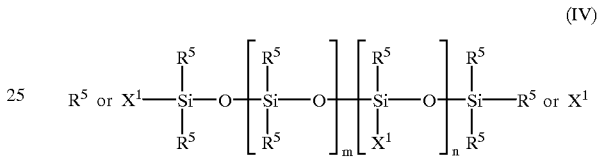

wherein $R^5$ represents an alkyl group or a phenyl group; $1 \leq m+n \leq 200$ and $n/(m+n) \geq 0.15$; $X^1$ represents an amino group or an N-substituted amino group represented by $-R^1NR^2R^3$ or $-R^1NHR^4NR^2R^3$; $R^1$ and $R^4$ represent $-(CH_2)_n-$ (provided that n is 1, 2 or 3); $R^2$ and $R^3$ may be the same or different and represent a hydrogen atom, an alkyl group having 1 to 36 carbon atoms or a phenyl group; m and n represent the total number of the respective structural units and include a continuous one (block structure) and one disposed at random (random structure).

4. The rubber composition as described in claim 3, wherein the alkyl group represented by $R^5$ in said formula has 1 to 3 carbon atoms.

5. The rubber composition as described in claim 1, wherein said dispersion-improving agent is a fatty acid ester-modified silicone oil represented by the following Formula (V):

(V)

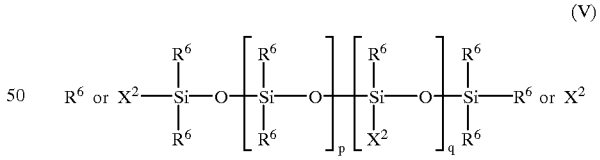

wherein $R^6$ represents an alkyl group or a phenyl group; $1 \leq p+q \leq 200$ and $q/(p+q) \geq 0.15$; $X^2$ represents a fatty acid ester group represented by $-OCOR^7$; $R^7$ represents an alkyl group or an alkenyl group each of which has 1 to 36 carbon atoms; p and q represent the total number of the respective structural units and include a continuous one (block structure) and one disposed at random (random structure).

6. The rubber composition as described in claim 5, wherein the alkyl group represented by $R^6$ in said formula has 1 to 3 carbon atoms.

7. The rubber composition as described in claim 1, wherein said dispersion-improving agent is an epoxy-modified silicone oil represented by the following Formula (VI):

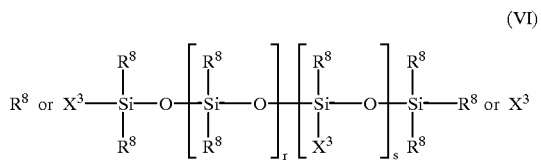

(VI)

wherein $R^8$ represents an alkyl group or a phenyl group; $1 \leq r+s \leq 200$ and $s/(r+s) \geq 0.15$; $X^3$ represents an epoxy-containing group represented by

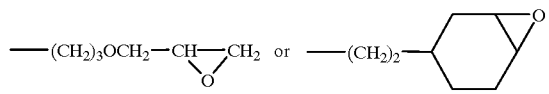

r and s represent the total number of the respective structural units and include a continuous one (block structure) and one disposed at random (random structure).

8. The rubber composition as described in claim 7, wherein the alkyl group represented by $R^8$ in said formula has 1 to 3 carbon atoms.

9. The rubber composition as described in claim 1, wherein said dispersion-improving agent is an alkoxyl-modified silicone oil represented by the following Formula (VII):

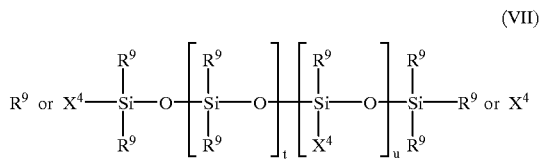

(VII)

wherein $R^9$ represents an alkyl group or a phenyl group; $1 \leq t+u \leq 200$ and $u/(t+u) \geq 0.15$; $X^4$ represents an alkoxyl group; t and u represent the total number of the respective structural units and include a continuous one (block structure) and one disposed at random (random structure).

10. The rubber composition as described in claim 9, wherein the alkyl group represented by $R^9$ in said formula has 1 to 3 carbon atoms, and the alkoxyl group represented by $X^4$ has 1 to 3 carbon atoms.

11. The rubber composition as described in claim 1, wherein said dispersion-improving agent is α,ω-dihydroxypolydimethylsiloxane represented by the following Formula (VIII):

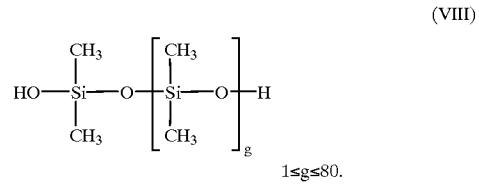

(VIII)

$1 \leq g \leq 80$.

12. The rubber composition as described in claim 3, 5, 7, 9 or 11, wherein an inorganic filler on which 30% by weight or more of said dispersion-improving agent is carried in advance is used such that the proportion of the dispersion-improving agent is controlled to 3 to 15% by weight based on the amount of silica.

13. The rubber composition as described in any of claims 2 to 11, further comprising a silane coupling agent which is blended in a proportion of 1 to 15% by weight based on the blending amount of silica.

14. The rubber composition as described in claim 13, wherein said silane coupling agent is represented by the following Formula (X) or (XI):

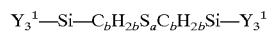

or

 (X)

wherein $X^5$ represents a nitroso group, a mercapto group, a thiocyanate group, an amino group, an epoxy group, a vinyl group, a chlorine atom or an imide group; $Y^1$ represents an alkyl group having 1 to 4 carbon atoms, an alkoxyl group having 1 to 4 carbon atoms or a chlorine atom and may be the same or different; a represents an integer of 1 or more; and b represents an integer of 1 to 6:

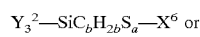 (XI)

wherein $X^6$ is represented by any of the following formulas:

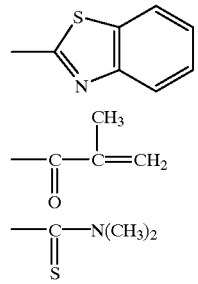

$Y^2$ represents an alkyl group having 1 to 4 carbon atoms, an alkoxyl group having 1 to 4 carbon atoms or a chlorine atom and may be the same or different; a represents an integer of 1 or more; and b represents an integer of 1 to 6.

15. The rubber composition as described in claim 13, wherein said silane coupling agent is at least one compound selected from the group consisting of bis(3-triethoxysilylpropyl)polysulfide, γ-mercaptopropyltrimethoxysilane, γ-mercaptopropyltriethoxysilane, γ-thiocyanatepropyltriethoxysilane, 3-trimethoxysilylpropyl-N,N-dimethylthiocarbamoyl tetrasulfide, trimethoxysilylpropylmercaptobenzothiazole tetrasulfide, triethoxysilylpropylmethacrylate monosulfide and dimethoxymethylsilylpropyl-N,N-dimethylthiocarbamoyl tetrasulfide.

16. The rubber composition as described in claim 13, wherein said silane coupling agent is bis(3-triethoxysilylpropyl)polysulfide.

17. The rubber composition as described in any of claims 2 to 11, further comprising carbon black as a reinforcing filler which is blended in an amount of 20 to 80 parts by weight per 100 parts by weight of the rubber component.

18. A rubber composition prepared by blending 20 to 60 parts by weight of silica and 30 to 80 parts by weight of carbon black having a cetyl trimethylammonium bromide-adsorbing amount (CTAB) of 120 m²/g or more and a dibutyl phthalate-absorbing amount (DBP) of 120 ml/100 g or more per 100 parts by weight of a rubber component comprising natural rubber and/or diene base synthetic rubber, and 3 to 15% by weight of a dispersion-improving agent based on the amount of silica, wherein the total amount of silica and carbon black is 50 to 120 parts by weight and the dispersion-improving agent is a compound selected from the group consisting of silicone oils represented by formulae (IV) to (VII) and (IX):

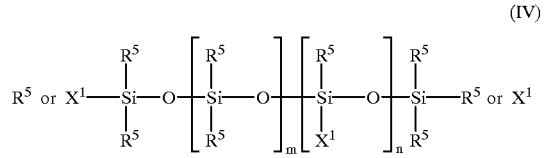
(IV)

wherein $R^5$ represents an alkyl group or a phenyl group; $1 \leq m+n \leq 200$ and $n/(m+n) \geq 0.15$; $X^1$ represents an amino group or an N-substituted amino group represented by —$R^1NR^2R^3$ or —$R^1NHR^4NR^2R^3$; $R^1$ and $R^4$ represent —$(CH_2)_n$— (provided that n is 1, 2 or 3); $R^2$ and $R^3$ may be the same or different and represent a hydrogen atom, an alkyl group having 1 to 36 carbon atoms or a phenyl group; m and n represent the total number of the respective structural units and include a continuous one (block structure) and one disposed at random (random structure),

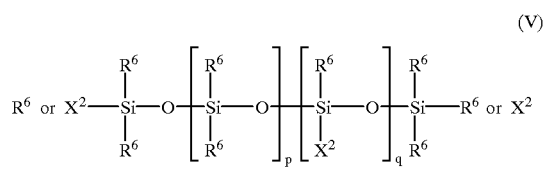
(V)

wherein $R^6$ represents an alkyl group or a phenyl group; $1 \leq p+q \leq 200$ and $q/(p+g) \geq 0.15$; $X^2$ represents a fatty acid ester group represented by —$OCOR^7$; $R^7$ represents an alkyl group or an alkenyl group each of which has 1 to 36 carbon atoms; p and q represent the total number of the respective structural units and include a continuous one (block structure) and one disposed at random (random structure),

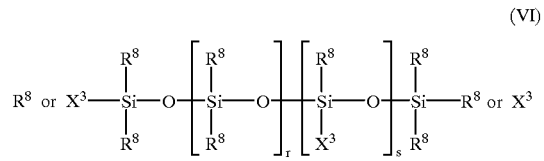
(VI)

wherein $R^8$ represents an alkyl group or a phenyl group, $1 \leq r+s \leq 200$ and $r/(r+s) \geq 0.15$; $X^3$ represents an epoxy-containing group represented by

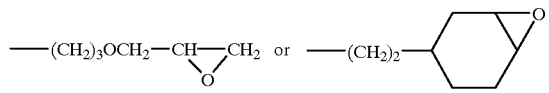

r and s represent the total number of the respective structural units and include a continuous one (block structure) and one disposed at random (random structure),

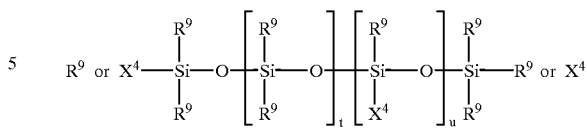
(VII)

wherein $R^9$ represents an alkyl group or a phenyl group; $1 \leq t+u \leq 200$ and $u/(t+u) \geq 0.15$; $X^4$ represents an alkoxyl group; t and u represent the total number of the respective structural units and include a continuous one (block structure) and one disposed at random (random structure),

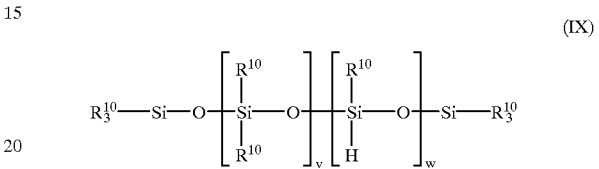
(IX)

wherein $R^{10}$ represents an alkyl group or a phenyl group; $1 \leq v+w \leq 200$ and $w/(v+w) \geq 0.15$; v and w represent the total number of the respective structural units and include a continuous one (block structure) and one disposed at random (random structure).

19. The rubber composition as described in claim 18, wherein said dispersion-improving agent is an amine-modified silicone oil represented by the following Formula (IV):

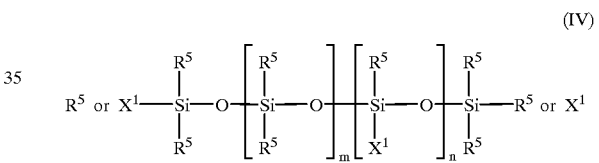
(IV)

wherein $R^5$ represents an alkyl group or a phenyl group; $1 \leq m+n \leq 200$ and $n/(m+n) \geq 0.15$; $X^1$ represents an amino group or an N-substituted amino group represented by —$R^1NR^2R^3$ or —$R^1NHR^4NR^2R^3$; $R^1$ and $R^4$ represent —$(CH_2)_n$— (provided that n is 1, 2 or 3); $R^2$ and $R^3$ may be the same or different and represent a hydrogen atom, an alkyl group having 1 to 36 carbon atoms or a phenyl group; m and n represent the total number of the respective structural units and include a continuous one (block structure) and one disposed at random (random structure).

20. The rubber composition as described in claim 19, wherein the alkyl group represented by $R^5$ in said formula has 1 to 3 carbon atoms.

21. The rubber composition as described in claim 18, wherein said dispersion-improving agent is a fatty acid ester-modified silicone oil represented by the following Formula (V):

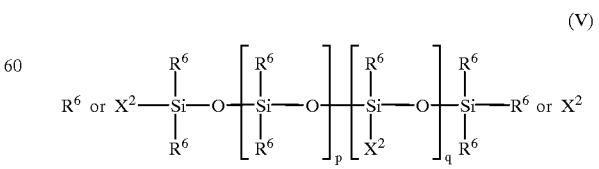
(V)

wherein $R^6$ represents an alkyl group or a phenyl group; $1 \leq p+q \leq 200$ and $q/(p+q) \geq 0.15$; $X^2$ represents a fatty acid ester group represented by —OCOR⁷; R⁷ represents an alkyl group or an alkenyl group each of which has 1 to 36 carbon atoms; p and q represent the total number of the respective structural units and include a continuous one (block structure) and one disposed at random (random structure).

22. The rubber composition as described in claim 21, wherein the alkyl group represented by R⁶ in said formula has 1 to 3 carbon atoms.

23. The rubber composition as described in claim 18, wherein said dispersion-improving agent is an epoxy-modified silicone oil represented by the following Formula (VI):

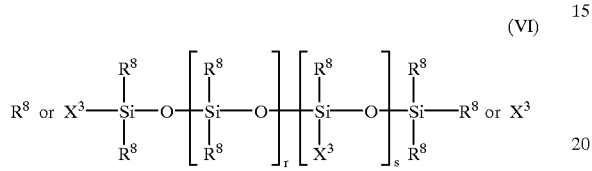

wherein R⁸ represents an alkyl group or a phenyl group; 1≦r+s≦200 and s/(r+s)≧0.15; X³ represents an epoxy-containing group represented by

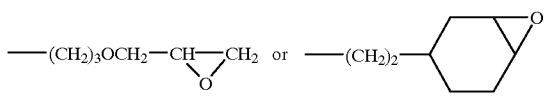

r and s represent the total number of the respective structural units and include a continuous one (block structure) and one disposed at random (random structure).

24. The rubber composition as described in claim 23, wherein the alkyl group represented by R⁸ in said formula has 1 to 3 carbon atoms.

25. The rubber composition as described in claim 18, wherein said dispersion-improving agent is an alkoxy-modified silicone oil represented by the following Formula (VII):

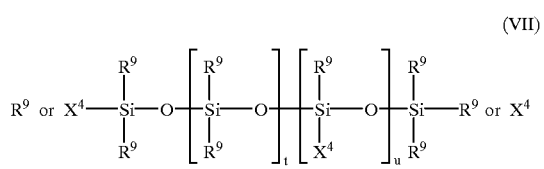

wherein R⁹ represents an alkyl group or a phenyl group; 1≦t+u≦200 and u/(t+u)≧0.15; X⁴ represents an alkoxyl group; t and u represent the total number of the respective structural units and include a continuous one (block structure) and one disposed at random (random structure).

26. The rubber composition as described in claim 25, wherein the alkyl group represented by R⁹ in said formula has 1 to 3 carbon atoms, and the alkoxyl group represented by X⁴ has 1 to 3 carbon atoms.

27. The rubber composition as described in claim 18, wherein said dispersion-improving agent is α,ω-dihydroxypolydimethylsiloxane represented by the following Formula (VIII):

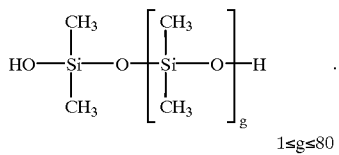

28. The rubber composition as described in claim 18, wherein said dispersion-improving agent is a hydrogen silicone oil represented by the following Formula (IX):

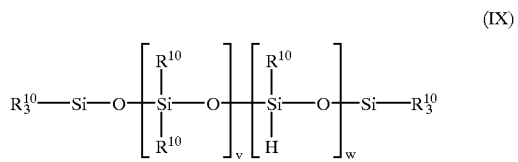

wherein R¹⁰ represents an alkyl group or a phenyl group; 1≦v+w≦200 and w/(v+w)≧0.15; v and w represent the total number of the respective structural units and include a continuous one (block structure) and one disposed at random (random structure).

29. The rubber composition as described in claim 28, wherein the alkyl group represented by R¹⁰ in said formula has 1 to 3 carbon atoms.

30. The rubber composition as described in claim 19, 21, 23, 25, 27 or 28, wherein an inorganic filler on which 30% by weight or more of said dispersion-improving agent is carried in advance is used such that the proportion of the dispersion-improving agent is controlled to 3 to 15% by weight based on the amount of silica.

31. The rubber composition as described in claim 18, further comprising a silane coupling agent in a proportion of 1 to 15% by weight based on the blending amount of silica.

32. The rubber composition as described in claim 31, wherein said silane coupling agent is represented by the following Formula (X) or (XI):

wherein X⁵ represents a nitroso group, a mercapto group, a thiocyanate group, an amino group, an epoxy group, a vinyl group, a chlorine atom or an imide group; Y¹ represents an alkyl group having 1 to 4 carbon atoms, an alkoxyl group having 1 to 4 carbon atoms or a chlorine atom and may be the same or different; a represents an integer of 1 or more; and b represents an integer of 1 to 6:

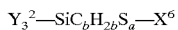

wherein X⁶ is represented by any of the following formulas:

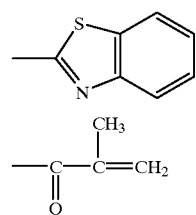

-continued

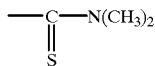

Y² represents an alkyl group having 1 to 4 carbon atoms, an alkoxyl group having 1 to 4 carbon atoms or a chlorine atom and may be the same or different; a represents an integer of 1 or more; and b represents an integer of 1 to 6.

33. The rubber composition as described in claim 31 or 32, wherein said silane coupling agent is at least one compound selected from the group consisting of bis(3-triethoxysilylpropyl)polysulfide, γ-mercaptopropyltrimethoxysilane, γ-mercaptopropyltriethoxysilane, γ-thiocyanatepropyltriethoxysilane, 3-trimethoxysilylpropyl-N,N-dimethylthiocarbamoyl tetrasulfide, trimethoxysilylpropylmercaptobenzothiazole tetrasulfide, triethoxysilylpropylmethacrylate monosulfide and dimethoxymethylsilylpropyl-N,N-dimethylthiocarbamoyl tetrasulfide.

34. The rubber composition as described in claim 31, wherein said silane coupling agent is bis(3-triethoxysilylpropyl)polysulfide.

35. A rubber composition prepared by blending 20 to 60 parts by weight of silica and 30 to 80 parts by weight of carbon black having a cetyl trimethylammonium bromide-adsorbing (CTAB) of 120 m²/g or more and a dibutyl phthalate-absorbing amount (DBP) of 120 ml/100 g or more per 100 parts by weight of a rubber component comprising natural rubber and/or diene base synthetic rubber, and 3 to 15% by weight of a dispersion-improving agent based on the amount of silica, wherein the total amount of silica and carbon black is 50 to 120 parts by weight and the dispersion-improving agent is a nitrogen-containing carbonyl compound represented by any of the following Formulas (I) to (III):

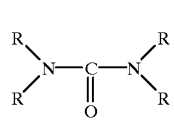

(I)

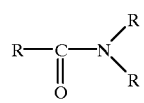

(II)

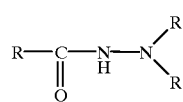

(III)

wherein R represents hydrogen, a linear or branched and saturated or unsaturated aliphatic hydrocarbon having 1 to 20 carbon atoms, an aromatic hydrocarbon or an alicyclic hydrocarbon and may be the same or different.

* * * * *